US007365508B2

(12) United States Patent
Iribe et al.

(10) Patent No.: US 7,365,508 B2
(45) Date of Patent: Apr. 29, 2008

(54) MOTOR, ACTUATOR AND CONTROLLER THEREOF

(75) Inventors: Masatsugu Iribe, Tokyo (JP); Hajime Yamanaka, Tokyo (JP); Yoshihiro Itoh, Tokyo (JP); Shinya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 10/722,413

(22) Filed: Nov. 28, 2003

(65) Prior Publication Data
US 2004/0155616 A1 Aug. 12, 2004

(30) Foreign Application Priority Data

| Nov. 29, 2002 | (JP) | ............................. 2002-348636 |
| Dec. 5, 2002 | (JP) | ............................. 2002-354261 |
| Oct. 27, 2003 | (JP) | ............................. 2003-366701 |

(51) Int. Cl.
*B25J 5/00* (2006.01)

(52) U.S. Cl. .................. 318/568.12; 318/599; 318/672

(58) Field of Classification Search ..................... None
See application file for complete search history.

(56) References Cited

U.S. PATENT DOCUMENTS

| 4,544,869 A | * | 10/1985 | Pittaway ..................... 318/293 |
| 4,633,156 A | * | 12/1986 | Besson et al. .............. 318/696 |
| 4,910,450 A | * | 3/1990 | Parker et al. ................ 318/811 |
| 4,988,273 A | * | 1/1991 | Faig et al. .................. 425/145 |
| 5,496,102 A | * | 3/1996 | Dimatteo et al. ........... 303/162 |
| 5,585,709 A | * | 12/1996 | Jansen et al. ............... 318/807 |
| 6,014,497 A | * | 1/2000 | Kerkman et al. ........... 388/811 |
| 6,346,790 B1 | * | 2/2002 | Kemp et al. ................. 318/813 |
| 6,469,469 B1 | * | 10/2002 | Chambers et al. .......... 318/801 |
| 6,583,598 B2 | * | 6/2003 | Raith et al. ................. 318/702 |
| 6,639,338 B1 | * | 10/2003 | Haner ......................... 310/166 |
| 6,759,820 B2 | * | 7/2004 | Karwath ..................... 318/254 |
| 6,885,225 B2 | * | 4/2005 | Ohmichi et al. ............ 327/112 |
| 2002/0030543 A1 | * | 3/2002 | French et al. ............... 330/297 |
| 2003/0107342 A1 | * | 6/2003 | Gallegos-Lopez .......... 318/701 |

FOREIGN PATENT DOCUMENTS

| JP | 07-031188 | 1/1995 |
| JP | 2001-076451 | 3/2001 |
| JP | 2001-155417 | 6/2001 |
| JP | 2001-222325 | 8/2001 |
| JP | 2002-283276 | 10/2002 |
| JP | 2002-288955 | 10/2002 |

\* cited by examiner

*Primary Examiner*—Lincoln Donovan
*Assistant Examiner*—Renata McCloud
(74) *Attorney, Agent, or Firm*—Oblon, Spivak, McClelland, Maier & Neustadt, P.C.

(57) ABSTRACT

A motor comprises: coil on/off switching devices for switching between an on-state wherein current is supplied to the coils, and a first off-state wherein the coil terminals are open-circuited or a second off-state wherein the coil terminals are short-circuited; and a coil current control device for controlling switching operations of the coil on/off switching devices according to commands input to the motor. In the event that motor movement with great mechanical compliance is required, the ratio of the period of the first off-state is increased, and on the other hand, in the event that motor movement with great viscosity resistance is required, the ratio of the period of the second off-state is increased. This solves the problems of torque loss and cogging during a period wherein no current is applied to the coil.

12 Claims, 31 Drawing Sheets

FIG. 6
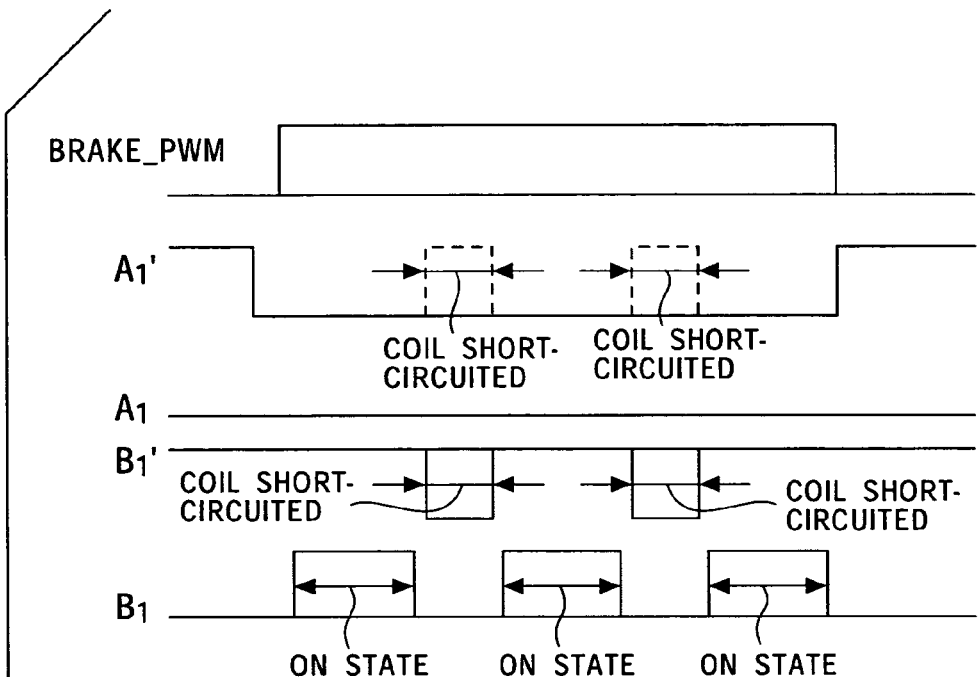
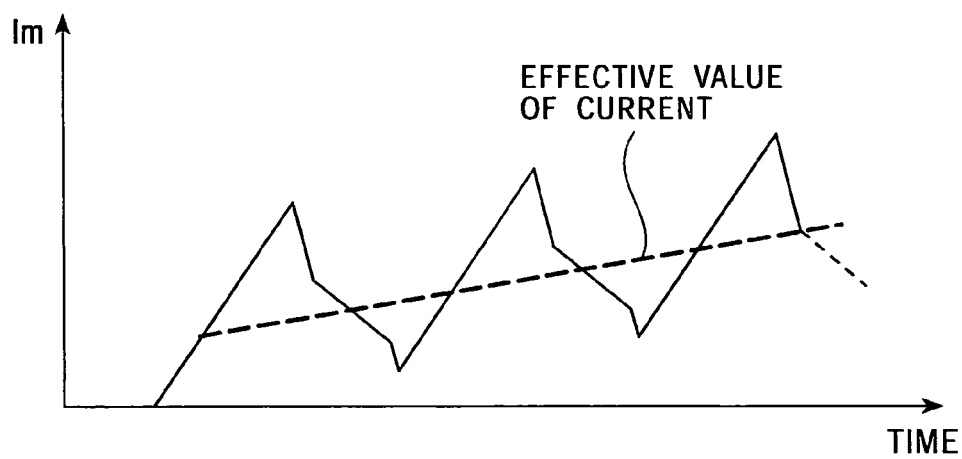
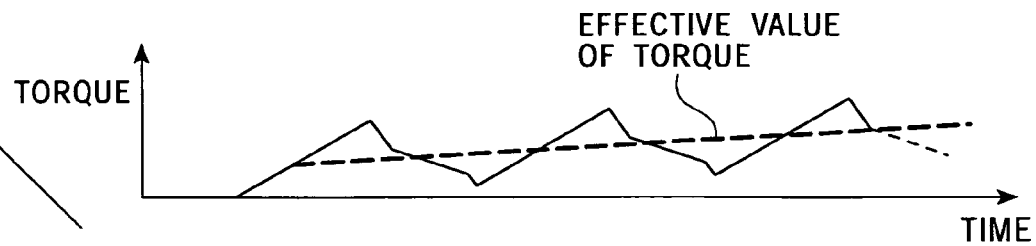

FIG. 9

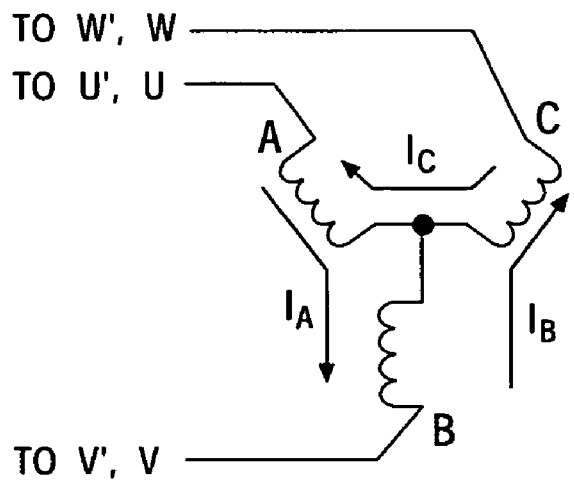

$I_A - I_C$: CURRENTS FLOWING A-PHASE MOTOR COIL THROUGH C-PHASE MOTOR COIL (A)

$R_A - R_C$: DC RESISTANCES OF A-PHASE MOTOR COIL THROUGH C-PHASE MOTOR COIL (Ω)

$L_A - L_C$: INDUCTANCES OF A-PHASE MOTOR COIL THROUGH C-PHASE MOTOR COIL (H)

$V_c$: POWER SUPPLY VOLTAGE FOR DRIVING MOTOR (V)

$K_t$: TORQUE COEFFICIENT OF MOTOR (N-m/A)

$K_a$: COUNTER-ELECTROMOTIVE VOLTAGE COEFFICIENT OF MOTOR (V/rad/s)

K: SERIES COMPENSATION GAIN
   (PROPORTIONAL GAIN)
C(s): PHASE COMPENSATION ELEMENT
   TRANSFER FUNCTION
G(s): TRANSFER FUNCTION MODEL
   OF MOTOR AND SPEED REDUCER

FIG. 27
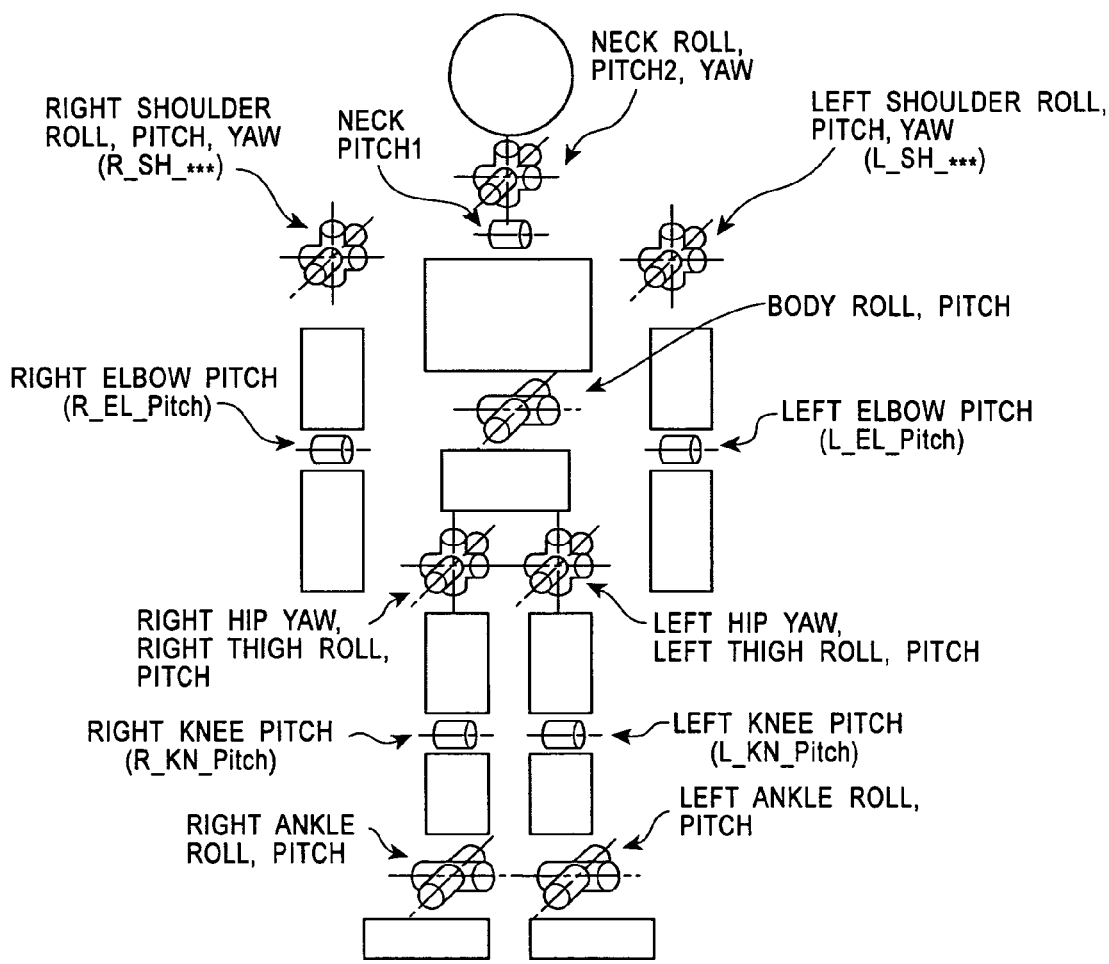
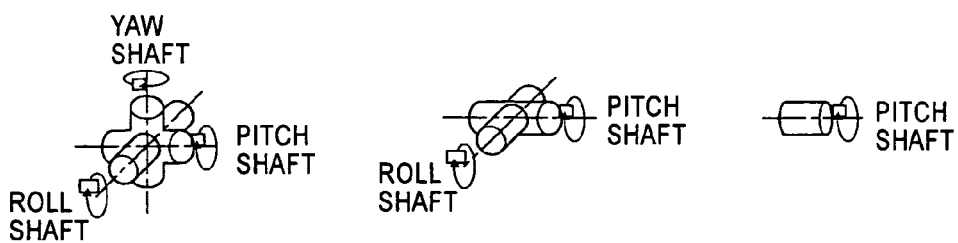

Im: CURRENT FLOWING MOTOR COIL (A)
Rm: DC RESISTANCE OF MOTOR COIL (Ω)
Lm: INDUCTANCE OF MOTOR COIL (H)
Vc: POWER SUPPLY VOLTAGE FOR DRIVING MOTOR (V)
Kt: TORQUE COEFFICIENT OF MOTOR (N-m/A)
Ka: COUNTER-ELECTROMOTIVE VOLTAGE
    COEFFICIENT OF MOTOR (V/rad/s)

$I_A - I_C$: CURRENTS FLOWING A-PHASE MOTOR COIL THROUGH C-PHASE MOTOR COIL (A)

$R_A - R_C$: DC RESISTANCES OF A-PHASE MOTOR COIL THROUGH C-PHASE MOTOR COIL (Ω)

$L_A - L_C$: INDUCTANCES OF A-PHASE MOTOR COIL THROUGH C-PHASE MOTOR COIL (H)

Vc: POWER SUPPLY VOLTAGE FOR DRIVING MOTOR (V)

Kt: TORQUE COEFFICIENT OF MOTOR (N-m/A)

Ka: COUNTER-ELECTROMOTIVE VOLTAGE COEFFICIENT OF MOTOR (V/rad/s)

MOTOR, ACTUATOR AND CONTROLLER THEREOF

BACKGROUND OF THE INVENTION

1. Field of the Invention

The present invention relates to a motor and actuator controller, applied to a device or an apparatus employing a multi-axial driving system such as a robot, general-purpose assembly apparatus, robot-hand apparatus, or other multi-axial controllers, and particularly to an AC or DC motor or actuator controller which generates rotational torque due to formation of a predetermined magnetic distribution by controlling a supplied current to a coil thereof.

More specifically, the present invention relates to a controller for an AC or DC motor or actuator wherein the coil current is controlled by PWM switching, and particularly to a controller which solves the problems of torque loss and cogging at times other than the on-period.

Furthermore, the present invention relates to a servo controller for an actuator employed as a joint actuator for a robot wherein each axial link is controlled under high-gain PD control, and particularly to a servo controller for an actuator for performing stable and high efficient operation by adjusting compliance thereof.

2. Description of the Related Art

An apparatus for performing operations similar to human movement using electric or magnetic action is referred to as a "robot". It is said that the origin of the term "robot" is derived from the word "ROBOTA", which means a slave machine in Slavic. While robots have come into wide use in the late 1960s in Japan, in most cases, such robots were used as industrial robots such as manipulators, transfer robots, or the like, in order to perform automatic manufacturing without operators in a factory.

Stationary robots, such as arm robots, which are installed at a fixed position, perform operation such as assembling of parts, selection of parts, or the like, in a fixed and local working space. On the other hand, mobile robots do not stay at a fixed position, but freely move along a predetermined route, or not according to a predetermined route, so as to provide human operation in a predetermined manner or in a flexible manner according to the situation, or so as to provide various types of services including a wide range of services which have been provided by humans, dogs, or other living things. Particularly, while ambulatory mobile robots are unstable, and have difficulty in controlling the attitude thereof and difficulty in controlling walking, as compared with crawler robots or tire robots, ambulatory mobile robots have the advantage of flexible movement such as descending and ascending stairs or a ladder, walking over an obstacle, and flexible walking or running regardless of unevenness of the floor.

Recently, while study and development of the ambulatory robots such as pet robots modeled on the body mechanism or movement of four-legged animals, e.g., dogs, cats, and the like, or human robots (which is also referred to as "humanoid robots") modeled on the body mechanism or movement of erect bipedal animals, i.e., humans, is progressing, demand for practical application of robots is increasing.

In general, these kinds of ambulatory robots include a great number of joint-degrees-of-freedom, and each joint is moved with an actuator motor. Furthermore, the ambulatory robots have a configuration wherein information regarding the rotational position, rotational amount, and the like, of each motor, is obtained, so as to perform servo control based thereupon, thereby performing movement in a desired pattern, as well as controlling the attitude thereof.

In general, servo motors are employed in the robots for increasing joint-degrees-of-freedom of the robots. This is due to the reasons that the servo motor is easy to use, and has a small size and high torque performance, and furthermore exhibits excellent responsibility. In particular, an AC servo motor is a maintenance-free motor having no brushes, and accordingly, the AC servo motor is suitably employed in a joint actuator of an automatic machine such as ambulatory robots which can freely walk, or the like, for operating in a working space without operators. The AC servo motor has a configuration wherein a permanent magnet is disposed as a rotor, and a multi-phase (e.g., three-phase) coils are disposed as a stator, so as to generate rotational torque for the rotor due to the sine-wave magnetic distribution and the sine-wave current.

In general, the ambulatory robot has a configuration including a great number of joints. Accordingly, the servo motor is required to be designed and formed with a small size and high performance for exhibiting great joint-degrees-of-freedom. For example, small-sized AC servo motors, which are directly connected by gears, having a configuration wherein servo control system, which can be employed as joint actuators in ambulatory mobile robots, is formed on one chip so as to be included in a motor unit are already available (see Japanese Unexamined Patent Application Publication No. 2000-299970, for example).

Multi-axial-driving apparatuses such as ambulatory robots require control for movement wherein the rotational position of each shaft is detected with high precision in a sure manner so as to control the movement based upon the positional commands. For example, erect bipedal mobile robots such as humanoid robots requires control for movement wherein the robot autonomously confirms the positional attitude of itself, and moves each shaft so as to be positioned to a stable attitude of the robot immediately following turning on the power supply. Accordingly, the servo actuator for rotational joint-degrees-of-freedom is required to perform control of positioning with high precision and high speed, as well as performing high torque output with low power consumption.

Conventionally, with multi-axial robots such as bipedal robots (humanoid robots), each axial link is controlled for corresponding joint portion under the high-gain PD control, and is moved with fixed properties, based upon the motion control theory.

However, as can be understood from the results of study of human motion, it is important that the force applied to each joint portion, or the compliance thereof, is adjusted, in order to perform stable and highly-efficient motion.

That is to say, while in a case of taking a motion of the joints as a positional control system, a servo control device with a high gain and wide band width is preferably employed so as to control the system with a small deviation, in a case of taking the motion of the joints as a dynamic model, motion control is preferably performed wherein the gain is reduced, or the frequency band for phase compensation is adjusted, according to the situation, at the same time, giving consideration to influence of the potential energy or the kinetic energy thereof.

However, in order to perform such control on the robot, functions for performing dynamic/static control of two kinds of properties (i.e., one is the properties of the actuator itself, and the other is the properties of the controller of the actuator) are required.

For example, with a bipedal robot having a configuration similar to a human body, including arms on the upper body, an arrangement is known as described in several documents wherein in the event that the attitude thereof becomes unstable due to low friction on the walking road, the upper body is driven so as to recover a stable attitude (see Japanese Unexamined Patent Application Publication No. 7-205069, for example). However, the aforementioned arrangement effects such performance by controlling the feed forward gain, and the aforementioned documents make no mention whatever of the viscosity of the joint, and frequency properties, and furthermore make no mention whatever of compliance of the joint.

Now, description will be made regarding driving control of an actuator, a well-known example of which is a servo motor.

In general, a servo motor comprises a rotor formed of a magnet which is rotatably held, and a stator formed of multi-phase coils with predetermined phase difference. The supplied current for each coil (which will be referred to as "coil current" hereafter) is adjusted so as to form the sine-wave magnetic flux distribution with predetermined phase difference on each phase coil, thereby generating rotational torque for the rotor.

For example, sine-wave currents are applied to stator coils of three-phase motors, U, V, and W, with predetermined phase difference, so as to form sine-wave magnetic flux distribution, thereby generating the rotational torque for the stator formed of a magnet. Conventionally, a star connection wherein one end of the coils are connected to a single node as shown in FIG. 28, or a delta connection wherein both ends of the coils are connected one to another as shown in FIG. 29, is employed for a coil connection of a synchronous AC servo motor. It is needless to say that the star connection or delta connection is not restricted to be applied to the AC servo motor; rather, such connections may be applied to a DC brushless motor. In general, the star connection is suitably employed for a high-voltage power supply, and on the other hand, the delta connection is suitably employed for a low-voltage power supply (Note that the delta connection is not employed in a permanent magnet AC motor in many cases. The reason is that harmonic current occurring due to the permanent magnet loops at the time of the motor rotating at a high speed, leading to reduction of the efficiency of the motor).

FIG. 30 is a diagram which shows a configuration example of an equivalent circuit of a current control circuit for supplying coil current, which is employed in a DC motor. Such a current control circuit is provided to a coil forming a stator, for example. A PWM control logic circuit generates current commands for a coil based upon current commands for controlling the stator magnetic field (torque commands) IO from an unshown central control unit so as to perform switching-control of transistors of the current control circuit with PWM method.

The current control circuit shown in FIG. 30 has a full-bridge configuration wherein a circuit formed of a pnp transistor A' and an npn transistor A, connected in the forward direction, and another circuit having the same configuration formed of a pnp transistor B' and an npn transistor B, connected in the forward direction, are connected between the power supply voltage Vcc and the ground GND in parallel, as well as the node between the transistors A' and A, and the node between the transistors B' and B, being connected with the single-phase coil forming a stator introduced therebetween.

Upon turning on the transistors A' and B as well as turning off the transistors A and B', the current $I_m$ flows in the motor coil in the direction of the arrow in the drawing. Next, upon turning off the transistors A' and B, the coil becomes open circuited, and accordingly, no current is applied to the coil.

Let us refer to the period for turning on the transistors A' and B as well as turning off the transistors A and B' so as to apply the coil current Im to the motor coil, as "$T_{on}$ period". On the other hand, let us refer to the period for turning off the transistors A' and B as well as turning off the transistors A and B' so that no current is applied to the motor coil, as "$T_{off}$ period".

FIGS. 31 and 32 show the relation of switching of each transistor and the switching current of the current control circuit shown in FIG. 30 (FIG. 31 shows the voltage waveforms for switching the transistors for controlling the coil current, and FIG. 32 shows the coil current waveform). Note that $T_{on}$ is determined with a pulse width so as to turn on the transistors A' and B, as well as turning off the transistors A and B', and $T_{PMP}$ is a constant cycle period for PWM switching. For example, in the event that $T_{on}$ is set to 30 μsec, and $T_{PMP}$ is set to 50 μsec, the current $I_m$ flows in the coil as shown in FIG. 32. As a result, the output torque of the motor is obtained corresponding to the input current to the coil.

In general, each transistor is controlled so as to perform suitable on/off operations according to PWM switching signals, thereby controlling the magnitude of the current $I_m$ which flows in the coil. The maximal current is determined by the maximal value of the pulse width $T_{on}$. The maximal pulse width is determined by the maximal period for transient required for on/off operations of the transistors forming the current control circuit, and the properties of the motor coil which is to be driven. Furthermore, taking the transient period for the on/off operations of the transistor into consideration, dead bands td are provided such that the transistor A' (or B') connected to the power supply voltage and the transistor A (or B) connected to the ground are not turned on at the same time.

Furthermore, FIG. 33 shows a configuration example of an equivalent circuit with regard to a current control circuit for supplying coil current, which is applied to a three-phase motor. In the example shown in the drawing, the stator coil set has a configuration employing the delta-connection method. A PWM control logic circuit calculates the phase of the current which is to be applied to each coil so as to generate current commands for coils U, V, and W, based upon current commands for controlling the stator magnetic field (torque commands) IO from an unshown central control unit, thereby performing switching-control of transistors U, U', V, V', W and W' of the current control circuit with PWM method.

The current control circuit shown in FIG. 33 has a full-bridge configuration wherein a circuit formed of a pnp transistor U' and an npn transistor U, connected in the forward direction, for forming U-phase magnetic flux distribution, a circuit having the same configuration formed of a pnp transistor V' and an npn transistor V, connected in the forward direction, for forming V-phase magnetic flux distribution, and a circuit having the same configuration formed of a pnp transistor W' and an npn transistor W, connected in the forward direction, for forming W-phase magnetic flux distribution, are connected in parallel. Each collector of the pnp transistors U', V', and W', of the aforementioned circuits, each of which includes one pair of transistors connected in the forward direction, are connected to the power supply voltage Vcc in parallel, as well as the emitters of the other npn transistors U, V, and W, being connected to the ground GND in parallel. Furthermore, one end of a coil A is connected to the node between the transistors U' and U, and the other end thereof is connected to the node between the transistors V' and V, one end of a coil B is connected to the node between the transistors V' and V, and the other end thereof is connected to the node between the transistors W' and W, and one end of a coil C is connected to the node between the transistors W' and W, and the other end thereof is connected to the node between the transistors U' and U.

Furthermore, FIG. 34 shows a configuration of the bridge portion in a case of employing three-phase coils in star connection, not in delta connection. In this case, as shown in the drawing, one ends of the coils A, B, and C, are terminated, and the other ends are connected to the node between the pnp transistor U' and the npn transistors U, the node between the pnp transistor V' and the npn transistors V, and the node between the pnp transistor W' and the npn transistors W, respectively, in serial.

Upon turning on the transistors U' and V, as well as turning off the transistors U and V', current $I_A$ flows in the coil A in the direction of the arrow in the drawings. Subsequently, upon turning off the transistors U' and V, the coil A becomes open circuited, whereby no current is applied to the coil.

In the same way, turning on the transistors V' and W, as well as turning off the transistors V and W', current $I_B$ flows in the coil B in the direction of the arrow in the drawings. Subsequently, upon turning off the transistors V' and W, the coil B becomes open circuited, whereby no current is applied to the coil.

Furthermore, in the same way, turning on the transistors W' and U as well as turning off the transistors W and U', current $I_C$ flows in the coil C in the direction of the arrow in the drawings. Subsequently, upon turning off the transistors W' and U, the coil C becomes open circuited, whereby no current is applied to the coil.

FIGS. 35 and 36 show the relation of switching of each transistor and the switching current of the current control circuit shown in FIG. 33 (FIG. 35 shows the voltage waveforms for switching the transistors for controlling the coil currents, and FIG. 36 shows the coil current waveforms). Each transistor is controlled so as to perform suitable on/off operations according to PWM switching signals, thereby controlling the magnitude of the currents $I_A$, $I_B$, and $I_C$ which flow in the coils. The maximal current is determined by the maximal value of the pulse width of the switching signals. Furthermore, dead bands td (not shown) are provided such that the transistor U' connected to the power supply voltage and the transistor U connected to the ground are not turned on at the same time. Dead bands are provided for V' and V, and for W' and W, in the same way.

Note that, with the PWM control for driving a motor, there are periods of time in which all the coils of the motor are open circuited regardless of the types of the DC motors such as brushless DC motors. For example, the hatched regions shown in FIG. 35 denote the periods of time in which all the phase coils of the motor A, B, and C, are open circuited.

At the time of the coil of the motor becoming open circuited, the current (more precisely, the flow of charges), which flows in the coil of the motor, decays, leading to loss of torque. Furthermore, motors having such a configuration often cause irregularity in torque due to cogging.

Description will be made below regarding the problems of loss of torque, cogging, and the like, at the time of the coils of the motor being open circuited (at the time of all the coils being open circuited, or during the period in time other than the period in time in which any coil is turned on), with reference to the example of the DC motor shown in FIG. 30.

An actual coil of the motor contains an inductance L and a DC resistance R, and accordingly, the coil current control circuit for the DC motor shown in FIG. 30 can be reduced to a model RL series circuit as shown in FIG. 37. As shown in the drawings, the RL series circuit serving as a model of the motor coil has a circuit configuration wherein one end is grounded to the ground GND, as well as the other end being connected to the power supply Vcc through a switch S1, and being grounded to the ground GND through a switch S2, in parallel.

Now, let us say that at the time of t=0, the switch S1 is turned on, and the switch S2 is turned off, so that current is applied to the coil RL. In this case, the coil current I flows in the direction of the arrow in the drawing. In this case, the transient response of the coil current $I_{on}(t)$ is represented by the following expression.

$$I_{on(t)} = \frac{V_{cc}}{R}\left\{1 - \exp\left(-\frac{R}{L}t\right)\right\} \quad \text{[Expression 1]}$$

Subsequently, the state wherein the switch S1 is on and the switch S2 is off is maintained until t=t1, following which both the switches S1 and S2 are turned off, so as to make the coil open circuited. In this case, the transient response of the coil current $I_{off}(t)$ is approximately represented by the following expression. Here, the coefficient α of the second term on the right hand side causes a gradient of the transient response function, around twice as great as the gradient thereof caused due to the decay time constant (the actual values are determined by the semiconductor properties of MOS-FETs, bipolar transistors, or the like, serving as the switching devices).

$$I_{off(t)} = \frac{V_{cc}}{R}\exp\left\{\frac{R}{L}(t-t_1)\right\} - \alpha(t-t_1) \quad \text{[Expression 2]}$$

The transient response property of the coil current represented by Expression 1 is shown in FIG. 38. The effective value $I_{eff}$ of the coil current wherein switching operations are repeated is represented by the following Expression 3. As shown in FIG. 32, the effective value of the coil current is smaller than the maximal coil current.

$$I_{eff} = \frac{\sqrt{\int I^2 dt}}{T} = \frac{\sqrt{\left(\int (I_{on(t)})^2 dt + \int (I_{off(t)})^2 dt\right)}}{T} \quad \text{[Expression 3]}$$

On the other hand, the output torque T of the motor is represented by the value wherein the coil current is multiplied by the torque coefficient $K_t$ ($T=K_t \cdot I$). Accordingly, the motor exhibits the motor output torque T as shown in FIG. 39, corresponding to the coil current shown in FIG. 32. As can be understood from the drawing, the effective value of the motor output torque is smaller than the maximal motor output torque at the time of the maximal coil current. That is to say, at the time of the coil of the motor becoming open circuited, the current (more precisely, the flow of charges), which flows in the coil of the motor, decays, leading to loss of torque. Furthermore, the motor having such a configuration often causes irregularity in torque due to cogging.

SUMMARY OF THE INVENTION

It is an object of the present invention to provide an excellent AC or DC motor for generating rotational torque due to a predetermined magnetic flux distribution formed by controlling current supplied to coils.

It is another object of the present invention to provide an excellent AC or DC motor wherein coil current is controlled by PWM switching.

It is another object of the present invention to provide an excellent AC or DC motor which eliminates the problems of torque loss and cogging during an off-period wherein no current is applied to the coil.

It is another object of the present invention to provide an excellent servo controller for an actuator, formed of a positioning control system including a series compensation proportional gain and a phase compensating element.

It is another object of the present invention to provide an excellent servo controller for an actuator employed as a joint actuator in a robot wherein each axial link is controlled with high-gain PD control.

It is another object of the present invention to provide an excellent servo controller for an actuator wherein compliance (mechanical compliance) can be adjusted, thereby providing stable and high-efficient movement.

The present invention has been made in order to solve the above-described problems, and accordingly, a motor for generating rotational torque due to a predetermined magnetic flux distribution formed by controlling supplied current to coils, according to the first aspect of the present invention comprises: coil on/off switching means for performing switching operations between an on-state wherein current is supplied to the coils, and either a first off-state wherein the coil terminals are open-circuited or a second off-state wherein the coil terminals are short-circuited; and coil current control means for controlling switching operation of the coil on/off switching means according to commands input to the motor.

In this case, the coil on/off switching means may comprise a first transistor switch set for connecting the coil terminals to the power supply voltage, and a second transistor switch set for connecting the coil terminals to the ground.

Furthermore, the coil current control means may control switching between the on-period and off-period of the first and second transistor switch sets with PWM (Pulse Width Modulation) method.

Furthermore, the coil current control means may control the motor to have the viscosity resistance by adjusting the ratio of the first off-state as to the second off-state, during a period wherein no current is supplied to the coils.

Furthermore, the coil current control means may control the ratio of the first off-state as to the second off-state, during a period wherein no current is supplied to the coils, with PWM (Pulse Width Modulation) method.

Furthermore, the coil current control means may increase the ratio of the first off-state as to the off-state of the coil in order to increase the mechanical compliance of the motor.

Furthermore, the coil current control means may increase the ratio of the second off-state as to the off-state of the coil in order to increase the viscosity resistance of the motor.

In general, a motor for generating rotational torque due to a predetermined magnetic flux distribution formed by controlling current supplied to coils includes a switching operation circuit formed of a first transistor switch set for connecting the coil terminals to the power supply voltage, and a second transistor switch set for connecting the coil terminals to the ground. The aforementioned switching operation circuit is driven with PWM control so as to control coil current, thereby obtaining desired torque, rotational position, rotational speed, and the like.

However, at the time of the coil of the motor is open circuited during a period wherein no current is applied to the coil (which will be referred to as "off-period" hereafter), the current (more precisely, the flow of charges), which flows in the coil of the motor, decays, leading to loss of torque. Furthermore, the motor having such a configuration often causes irregularity in torque due to cogging.

Accordingly, with the present invention, the short-circuited state, wherein the coil is not open-circuited, is introduced during the off-period of the motor coil, thereby preventing immediate decay of the current (more precisely, the flow of charges), which flows in the coil of the motor. In this case, the counterelectromotive force occurs due to the magnetic flux density from the permanent magnet. Accordingly, the force occurs in the direction reverse to the rotational direction of the motor due to the counterelectromotive force, thereby exhibiting viscosity resistance against the rotation from the external force, and thereby obtaining effects similar to braking. Such a viscosity resistance reduces irregularity in torque without loss of torque.

As described above, in the event that the coil is short-circuited during an off-period, the motor has a kind of viscosity resistance, as described above. However, in the event that such a motor is employed in a robot, a problem occurs that the robot has no compliance from braking due to the coil being short-circuited.

Accordingly, with the present invention, the ratio of the period of the state wherein the motor coils are open-circuited as to the period of the state wherein the motor coils are short-circuited during an off-period of the motor coils, is adjusted according to desired mechanical properties with PWM method, for example, thereby eliminating the problem of irregularity in torque from torque loss or cogging, due to decay of current (more precisely, the flow of charges), which flows in the coil of the motor, during a period wherein the motor coils are open-circuited, and the problem of shortage of compliance (mechanical compliance) from the braking effects due to the coil being short-circuited during an off-period of the motor coils, at the same time.

A servo controller for an actuator including a positioning control system having a series compensation proportional gain, and a phase compensation element, according to the second aspect of the present invention, comprises phase compensation band setting means for freely adjusting the frequency band for performing phase compensation by the phase compensation element.

With the servo controller for the actuator according to the second aspect of the present invention, the frequency band for performing phase compensation is freely adjusted so as to control the frequency properties of the actuator. Thus, the frequency properties of a joint shaft of a robot formed of such actuators can be dynamically adjusted according to the attitude of the robot or the movement situation.

Furthermore, with the servo controller for the actuator according to the second aspect of the present invention, the frequency band for performing phase compensation can be adjusted while maintaining the amount of phase compensation to a constant value.

For example, in the event that phase compensation is performed over the entire frequency range, the actuator exhibits relatively high gain over the entire frequency range, but often leading to loss of energy. Furthermore, in the event that the motor load changes, the actuator cannot exhibit stable movement.

On the other hand, in the event that phase compensation is performed for a high-frequency band, phase lead compensation is performed only in a high-frequency range, and accordingly, this phase compensation control has marked advantages with regard to high-speed actions such as running, jumping, dancing, or the like, while having little advantages with regard to slow actions.

A servo controller for an actuator according to the second aspect of the present invention may further comprises series compensation proportional gain setting means for freely adjusting the magnitude of the proportional gain.

As described above, in the event that phase compensation is performed for a high-frequency band, phase lead compensation is performed only in a high-frequency range, and accordingly, this phase compensation control has little advantages with regard to slow actions. However, with the servo controller for an actuator according to the second aspect of the present invention, the gain can be increased in a low-frequency band by the series compensation proportional gain setting means, thereby reducing control deviation in the low-frequency band. As a result, the actuator can make high-speed response to command values, even in a case of low-speed action.

Furthermore, a servo controller for an actuator including a positioning control system having a series compensation proportional gain, and a phase compensation element, according to the third aspect of the present invention, comprises phase compensation amount setting means for freely adjusting the amount of phase compensation performed by the phase compensation element.

With the servo controller for an actuator according to the third aspect of the present invention, the amount of phase compensation can be adjusted so as to control the frequency properties of the actuator. Thus, the frequency properties of a joint shaft of a robot formed of such actuators can be dynamically adjusted according to the attitude of the robot or movement situation.

A servo controller for an actuator including a positioning control system having a series compensation proportional gain, and a phase compensation element, according to the fourth aspect of the present invention, comprises series compensation proportional gain setting means for freely adjusting the magnitude of the series compensation proportional gain.

Furthermore, the servo controller for an actuator according to the invention, may further comprises viscosity coefficient setting means for controlling the viscosity resistance of the actuator.

An actuator including a servo controller according to the present invention may be employed in each joint portion of a bipedal mobile robot.

For example, with the actuator employed in the neck portion, a high proportional gain is employed in order to improve the positioning precision with the highest priority. Furthermore, a great viscosity coefficient is employed for the joint in order to obtain robustness against the vibration due to external influence occurring at the time of the portions lower than the trunk moving.

On the other hand, with the actuator employed in the joints of the shoulder and elbow portions, in the event that the robot performs a sequential movement such as walking, dancing, or the like, the actuator is controlled to have the properties so as to exhibit the improved mechanical compliance with the positioning precision. In this case, the viscosity coefficient of the joint is set to a small value so as to exhibit movement with compliance. Furthermore, the proportional gain is set to a low value in order to reduce power consumption. Furthermore, the frequency band for performing phase lead compensation is set to a great value, and the phase lead is set to a great value, in order to increase the speed of the movement. While the robot performs various types of movements, the robot may perform a reciprocal movement as like a pendulum swinging. In this case, the viscosity coefficient of the corresponding joints and the proportional gain are set to the minimal values so as to obtain mechanical compliance, thereby facilitating use of a great part of dynamic energy for the movement.

On the other hand, in the event that the robot performs a loading movement such as pushing or pulling an object, the actuator is controlled such that the properties for improving positioning precision with the highest priority, and the properties for improving the mechanical compliance, are dynamically switched according to loading torque. In the event that the robot performs movement with force greater than the loading torque, the proportional gain and the viscosity coefficient of the corresponding joints are increased. On the other hand, in the event that the robot performs movement with a constant loading force following the loading torque, control is not performed only according to top-down positioning command values, but is also performed by adjusting the proportional gain and the viscosity coefficient of the corresponding joints based upon the loading torque detected by a torque detector within the actuator. Specifically, the proportional gain and the viscosity coefficient of the corresponding joints are reduced as compared with a case of the above-described loading movement so as to obtain mechanical compliance.

On the other hand, with the actuator employed in the trunk portion, the viscosity coefficient of the corresponding joints is increased in order to obtain robustness against the vibration occurring from the external influence due to the movement thereof. The proportional gain is set to a high value in order to improve the positioning precision with the highest priority. A small amount of phase lead is employed within a range wherein deterioration in the stability obtained does not occur due to an increase of the proportional gain while maintaining the speed of the movement.

On the other hand, with the actuator employed in the crotch-joint portion, the viscosity coefficient of the corresponding joints is increased in order to obtain robustness against the vibration occurring from the external influence due to the movement thereof. The proportional gain is set to a high value in order to improve the positioning precision with the highest priority. A small amount of phase lead is employed within a range wherein deterioration in the stability obtained does not occur due to an increase of the proportional gain while maintaining the speed of the movement.

On the other hand, with the actuator employed in the knee portion, at the time of the leg of the robot being off the ground, or at the point of the leg touching the ground, the actuator is controlled so as to improve the mechanical compliance with a priority higher than with the positioning precision. That is to say, the viscosity coefficient of the corresponding joints is reduced in order to exhibit the movement with compliance. Furthermore, the proportional gain is set to a small value in order to reduce the power consumption, as well as exhibiting the movement with compliance. Furthermore, the frequency band for performing phase lead compensation is increased, and the phase lead is set to a great value, in order to increase the speed of the movement.

On the other hand, at the time of the leg supporting the body of the robot, the viscosity coefficient of the corresponding joints is increased in order to obtain robustness against the vibration occurring from the external influence due to the movement thereof, the proportional gain is set to a great value so as to improve the positioning precision with a high priority, and a small amount of phase lead is employed within a range wherein deterioration in the stability obtained does not occur due to an increase of the proportional gain while maintaining the speed of the movement.

On the other hand, with the actuator employed in the ankle portion, at the time of the leg of the robot being off the ground, or at the point of the leg touching the ground, the actuator is controlled so as to improve the mechanical compliance with a priority higher than with the positioning precision. The viscosity coefficient of the corresponding joints is set to a small value so as to obtain the mechanical compliance, thereby reducing the impact due to the leg portion touching the ground. Furthermore, the frequency band for performing phase compensation is increased, and the phase lead is set to a great value, in order to increase the speed of the movement.

On the other hand, at the time of the leg supporting the body of the robot, the torque generated at the ankle portion is increased, and the viscosity coefficient of the corresponding joints is set to a great value in order to obtain robustness against the vibration occurring from the external influence due to the movement thereof. The proportional gain is set to a high value in order to improve the positioning precision for the ankle portion. A small amount of phase lead is employed within a range wherein deterioration in the stability obtained does not occur due to an increase of the proportional gain while maintaining the speed of the movement.

The present invention provides an excellent AC or DC motor, wherein the coil currents are controlled by PWM switching.

Furthermore, the present invention provides an excellent AC or DC motor, which eliminates the problems of torque loss and cogging due to periods wherein no current is applied to the motor coils.

On the other hand, in the event that the coil is short-circuited during an off-period, the motor has a kind of viscosity resistance. However, in the event that such a motor is employed in a robot, a problem occurs that the robot has no compliance from braking due to the coil being short-circuited. With the present invention, the ratio of the period of the state wherein the motor coils are open-circuited as to the period of the state wherein the motor coils are short-circuited during an off-period of the motor coils, is adjusted according to desired mechanical properties, thereby eliminating the problem of irregularity in torque from torque loss or cogging, due to decay of current (more precisely, the flow of charges), which flows in the coil of the motor, during a period wherein the motor coils are open-circuited, and the problem of shortage of compliance (mechanical compliance) from the braking effects due to the coil being short-circuited during an off-period of the motor coils, at the same time.

Furthermore, the present invention provides an excellent servo controller for an actuator, including a positioning control system formed of a series compensation proportional gain, and a phase compensating element.

Furthermore, the present invention provides an excellent servo controller for an actuator, which can be employed as a joint actuator of a robot wherein each axis link is controlled with high-gain PD control.

Furthermore, the present invention provides an excellent servo controller for an actuator, wherein the compliance (mechanical compliance) can be adjusted, thereby providing stable and high-efficient movement.

Further objects, features and advantages of the present invention will become apparent from the following description of the preferred embodiments with reference to the attached drawings.

BRIEF DESCRIPTION OF THE DRAWINGS

FIG. 6 is a diagram which shows output properties of control signals for each transistor, converted by the additional logic circuit, along with the coil current waveform property and the torque output property, in the event that a high-level BREAK_PWM signal is input to the additional logic circuit;

FIG. 9 is a diagram which shows a configuration of a bridge portion in a case of employing a three-phase coil formed with a star connection, rather than a delta connection;

FIG. 27 is a schematic diagram which shows a degree-of-freedom configuration example of an ambulatory mobile robot;

DESCRIPTION OF THE PREFERRED EMBODIMENTS

Description will be made below in detail regarding embodiments according to the present invention with reference to the drawings.

A. Configuration of Actuator Motor

In general, a motor having a configuration wherein current supplied to the coil is controlled so as to form a predetermined magnetic flux distribution, thereby generating rotational torque, comprises a switching circuit formed of a first transistor switch set for connecting the terminals of coils to the power supply voltage, and a second transistor switch set for grounding the terminals of the coils, wherein the switching circuit is driven under the PWM control so as to control coil currents, thereby obtaining a desired torque, rotational position, rotational speed, and the like.

However, at the time of no current being applied to the coils of the motor due to the coils being open circuited, the current (more precisely, the flow of charges), which flows in the coil of the motor, decays, leading to loss of torque. Furthermore, the motor having such a configuration often causes irregularity in torque due to cogging (as described above).

Accordingly, a motor according to the present invention has a configuration which provides a short circuited state wherein the coils are not open circuited, even during the period in time in which no current is applied to the coils of the motor, thereby prevent the current (more precisely, the flow of charges), which flows in the coil of the motor, from decaying. With such a configuration, counter-electromotive force occurs in the coil of the motor due to the magnetic flux density from a permanent magnet. Accordingly, force occurs in the direction reverse to the rotational direction of the motor, and accordingly, viscous resistance to rotation of the motor due to external force occurs, thereby obtaining effects similar to braking. Thus, such viscous resistance eliminates the problem of loss of the torque, and reduces the influence due to cogging.

Figure 37:
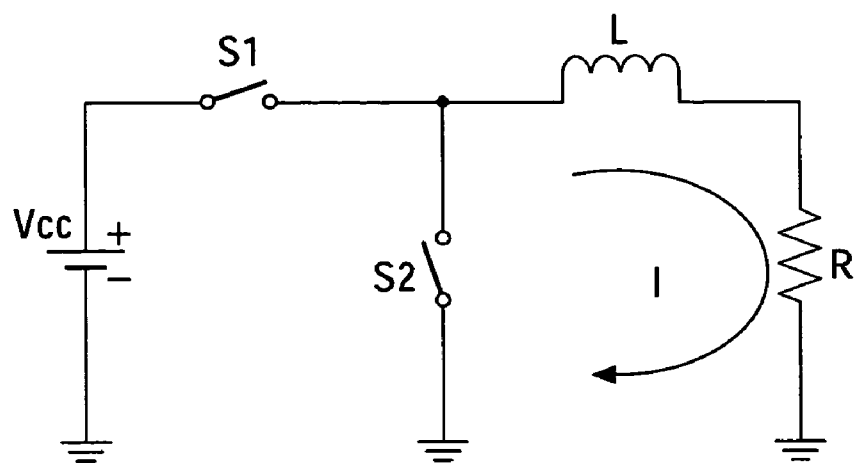
FIG. 37 is a circuit diagram which shows an RL series circuit serving as a model of a coil current control circuit of the DC motor shown in FIG. 30.
Figure 38:
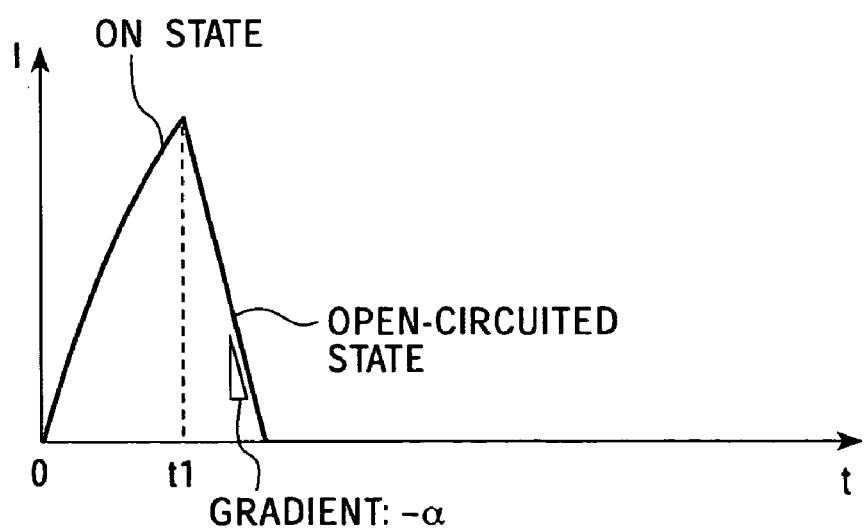
FIG. 38 is a diagram which shows the transient response property (conventional example) in the event that switching is performed from the state wherein current is applied to a coil, to the state wherein the coil is open-circuited.
Figure 39:
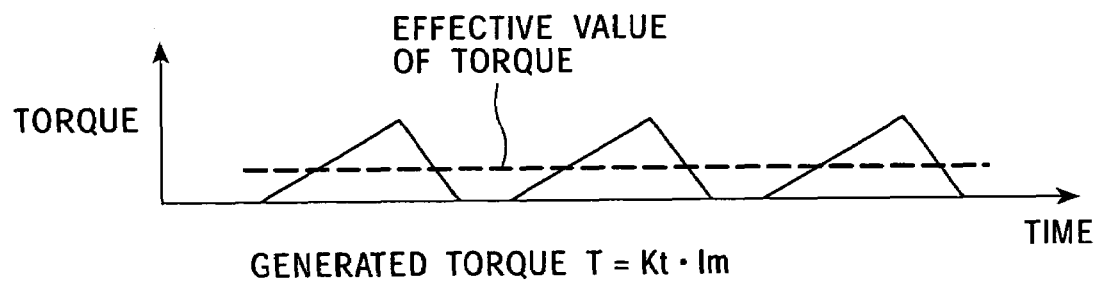
FIG. 39 is a diagram which shows the change in the motor torque over time, corresponding to the change in the coil current over time shown in FIG. 32.

Now, description will be made regarding the operation for obtaining the braking effects from the force reverse to rotation of the motor caused due to the counter-electromotive force in the coil of the motor, with reference to the model coil current control circuit wherein a coil of the motor is represented by an RL series circuit as shown in FIG. 37.

First, let us say that the switch S1 is turned on, and the switch S2 is turned off, at the time of t=0, so that current is applied to the coil RL. In this case, the coil current I flows in the direction of the arrow in the drawing. In this case, transient response of the coil current $I_{on}(t)$ is represented by the following expression.

$$I_{on(t)} = \frac{V_{cc}}{R}\left\{1 - \exp\left(-\frac{R}{L}t\right)\right\}$$ [Expression 4]

Subsequently, the state wherein the switch S1 is on and the switch S2 is off is maintained until t=t1, following which the switch S1 is turned off, and the switch S2 is turned on, so as to short-circuit the coil. In this case, the transient response of the coil current $I_{off}(t)$ is represented by the following expression.

$$I_{off(t)} = \frac{V_{cc}}{R}\left\{\exp\left(-\frac{R}{L}(t-t_1)\right) - \exp\left(-\frac{R}{L}t\right)\right\}$$ [Expression 5]

Figure 1:
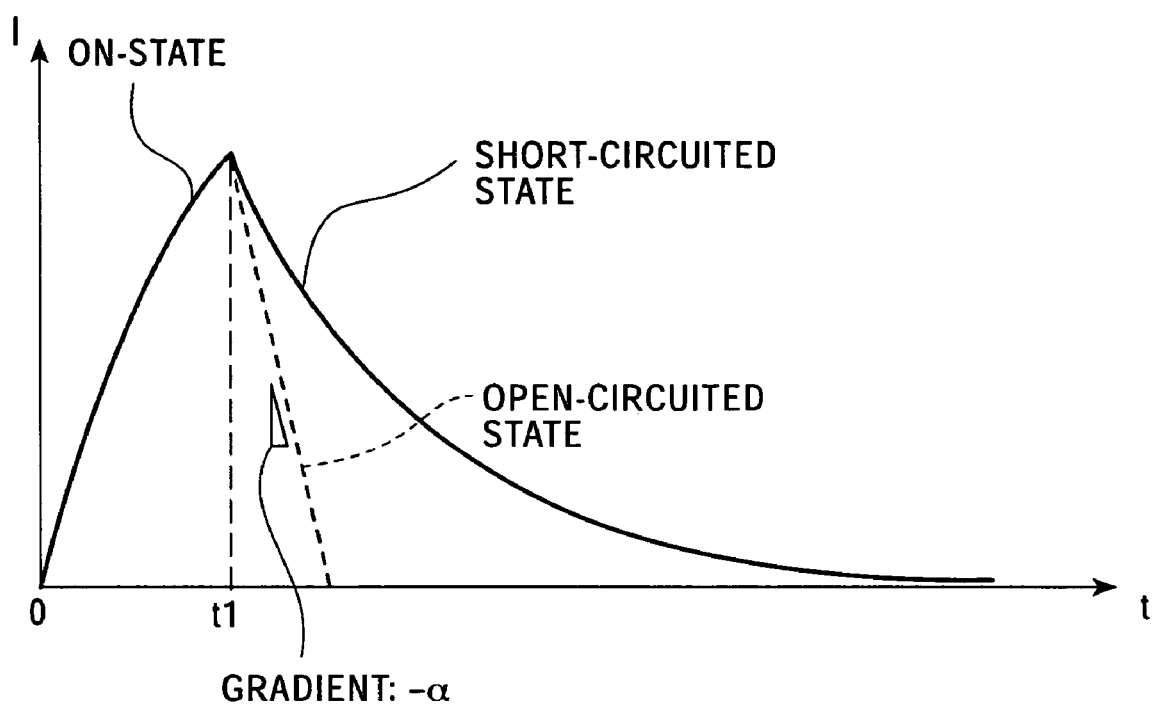
FIG. 1 is a diagram which shows the transient response property (the present invention) in the event that switching is performed from the state wherein current is applied to a coil, to the state wherein the coil is short-circuited.

FIG. 1 shows the transient response property of the coil current wherein current is applied to the coil, following which the coil is short-circuited during the period of time in which no current is applied to the coil, as compared with the transient response property thereof wherein the coil is open-circuited during the period of time in which no current is applied to the coil. As can be understood from the drawing, with the configuration wherein the coil is short-circuited during the period of time in which no current is applied, the period in which the coil current returns to zero due to transient response increases.

Figure 2:
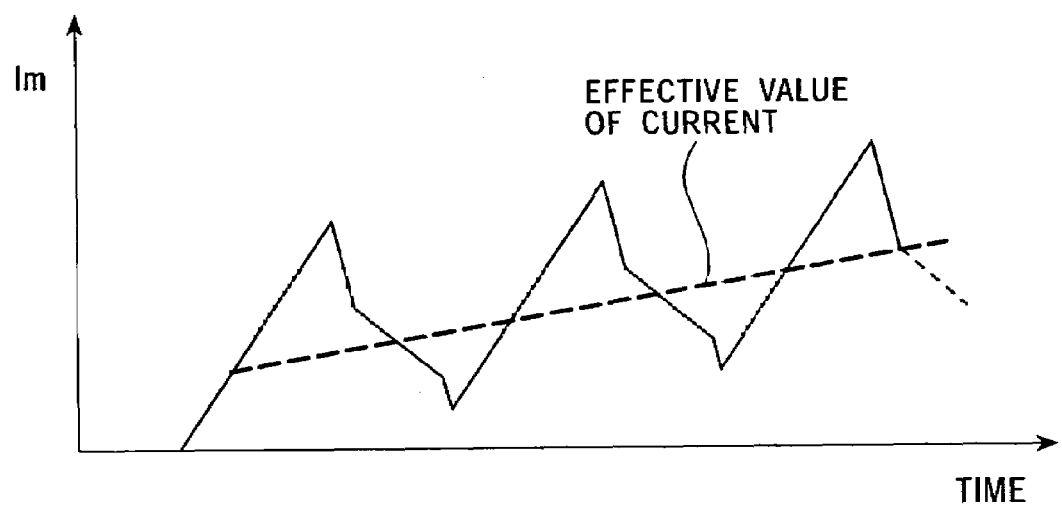
FIG. 2 is a diagram which shows a coil current waveform in the event that the switching shown in FIG. 1, between state wherein current is applied to a coil, and the state wherein the coil is short-circuited, is repeated.

In the event that the above-described operation is repeated, next operation for applying current to the coil is started again, prior to the time at which the coil current returns to zero during the period of time in which no current is applied, and accordingly, the maximal current of the coil successively increases with every operation wherein current is applied to the coil, following which no current is applied. In the same way, the effective value of the coil current $I_{eff}$ gradually increases as shown in the drawings. FIG. 2 shows the coil current waveform in this case.

Figure 3:
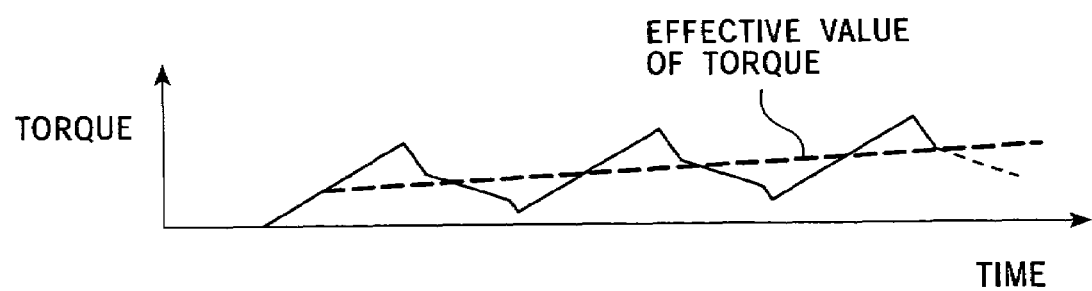
FIG. 3 is a diagram which shows the change in the motor torque over time, corresponding to the change in the coil current over time shown in FIGS. 1 and 2.

On the other hand, the output torque T of the motor is represented by the value wherein the coil current is multiplied by the torque coefficient $K_t$ (i.e., $T=K_t \cdot I$). Accordingly, the motor exhibits the motor output torque as shown in FIG. 3, corresponding to the coil current shown in FIG. 2. As can be understood from the drawing, the effective value of the motor output torque increases corresponding to an increase of the coil current in a case of repetition of the operation wherein current is applied to the coil, and the coil is short-circuited. As described above, the coil of the motor is short circuited during the period of time in which no current is applied to the coil, thereby preventing the current (more precisely, the flow of charges), which flows in the coil of the motor, from decaying, and thereby eliminating the problem of loss of the torque. Furthermore, the motor having such a configuration reduces the problem of irregularity in torque due to cogging.

In a case of a configuration wherein the coil is short circuited during the period of time in which no current is applied to the motor coil, the force serving as viscous resistance is provided to the motor, as described above. However, in the event that such a motor is employed for a robot, a problem occurs that the portion employing the motor exhibits small compliance from braking due to the coil being short-circuited.

Accordingly, in order to solve both the problem of irregularity in torque from torque loss or cogging, due to decay of current (more precisely, the flow of charges) which flows in the coil of the motor during the period of time in which the coil is open circuited, and the problem of small compliance (mechanical compliance) from the braking due to the coil being short circuited during the period of time in which no current is applied to the motor coil, the present invention provides an arrangement wherein the ratio of the period of the coil being open circuited as to the period of the coil being short circuited, during the period of time in which no current is applied to the motor coil, is adjusted according to desired mechanical properties.

Note that while the ratio of the on-period of the motor as to the off-period thereof can be adjusted by PWM control, the ratio of the period of the coil being open-circuited as to the period of the coil being short-circuited during a period in which no current is applied to the motor coil, can be adjusted by PWM control, as well.

Figure 4:
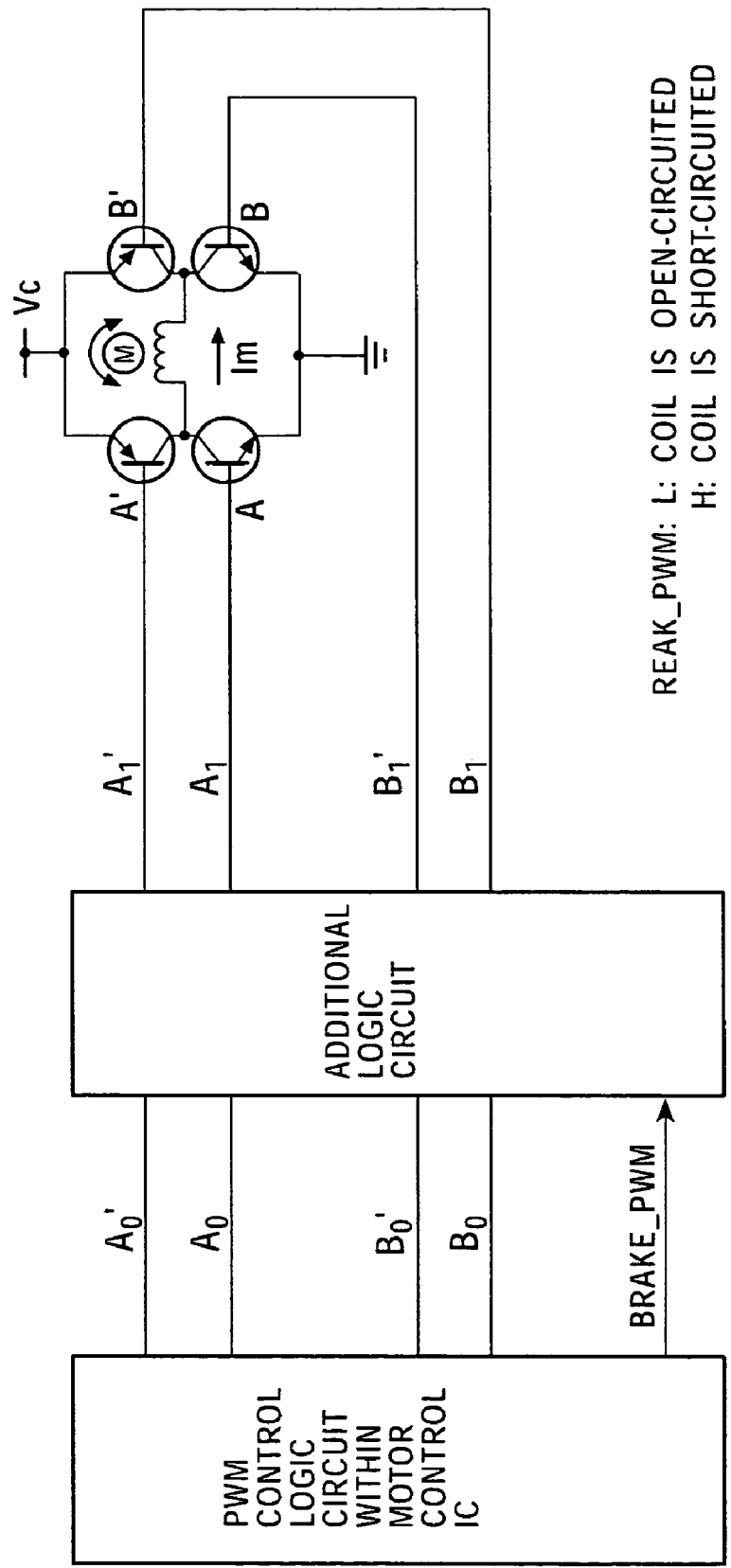
FIG. 4 is a configuration example of an equivalent circuit of a current control circuit for supplying coil current in a case of applying the control mechanism for coil current according to the present invention to a DC motor.

FIG. 4 shows a configuration example of an equivalent circuit of a current control circuit for supplying coil current to a DC motor employing the coil current control mechanism according to the present invention.

The current control circuit shown in the drawing has a full-bridge configuration wherein a circuit formed of a pnp transistor A' and an npn transistor A, connected in the forward direction, and another circuit having the same configuration formed of a pnp transistor B' and an npn transistor B, connected in the forward direction, are connected between the power supply voltage Vcc and the ground GND in parallel, as well as the node between the transistors A' and A, and the node between the transistors B' and B, being connected with a single-phase coil forming a stator introduced therebetween.

Upon turning on the transistors A' and B, as well as turning off the transistors A and B', the current $I_m$ flows in the motor coil in the direction of the arrow in the drawing. Subsequently, upon turning off the transistors A' and B, the coil becomes open circuited, the current $I_m$ does not flow. On the other hand, upon turning off the transistors A' and B, as well as turning on the transistors A and B', the motor coil becomes short-circuited.

A PWM control logic circuit generates current commands for a coil based upon current commands for controlling the stator magnetic field (torque commands) from an unshown central control unit so as to perform switching-control of the transistors with PWM method. That is to say, the on-period wherein the transistors A' and B are turned on, as well as the transistors A and B' being turned off, so that the current $I_m$ is applied to the coil, and the off-period wherein the transistors A' and B are turned off so that no current is applied to the coil, are alternately generated.

Figure 5:
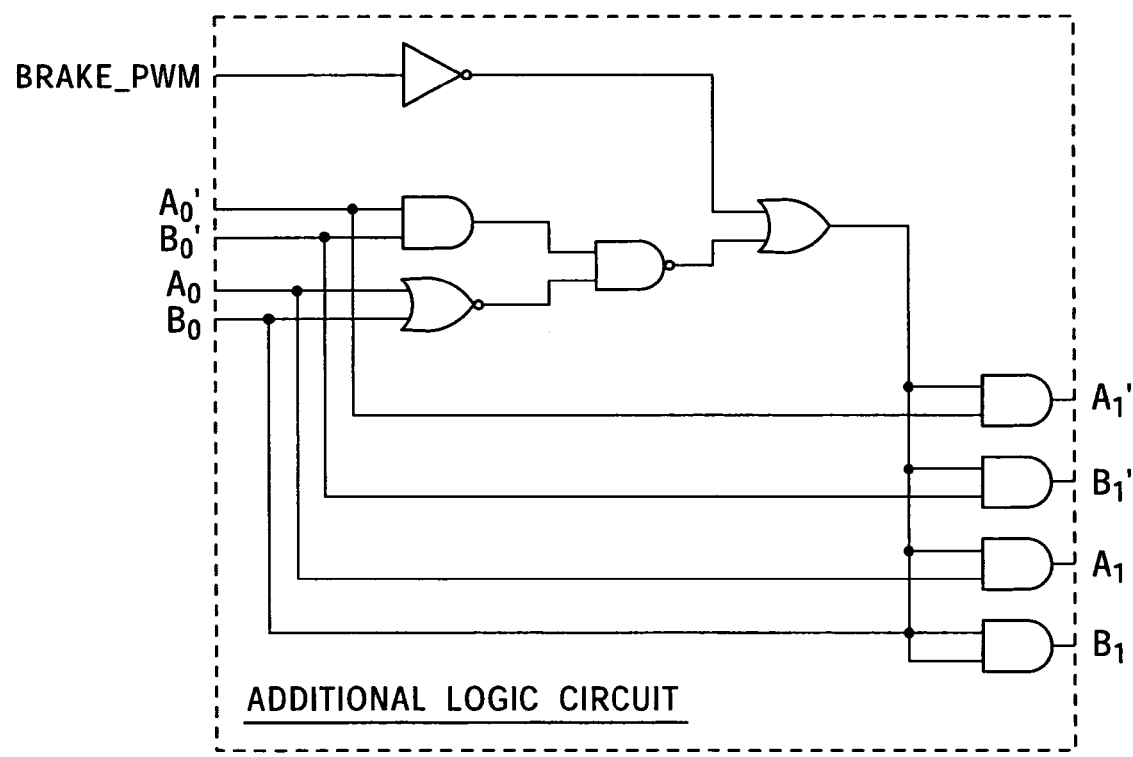
FIG. 5 is a diagram which shows a configuration of an additional logic circuit.

An additional logic circuit generates control logic signals for controlling on/off operation of the transistors from the signals A0, A0', B0, and B0', output from the PWM control logic circuit, with an additional logic function. Thus, the state of the coil can be switched between the state of the coil being open-circuited and the state of the coil being short-circuited during a period in which no current is applied to the motor coil, according to the control logical signals output from the additional logic circuit. FIG. 5 shows a specific circuit configuration of the additional logic circuit.

With the additional logic circuit shown in FIG. 5, the logical control signals $A_0$, $A_0'$, $B_0$, and $B_0'$, output from the PWM control logic circuit, for controlling the transistors A, A', B, and B', respectively, are converted into the final logical control signals, as follows.

That is to say, first, the logical product of the logical signals $A_0'$ and $B_0'$ is taken (which will be referred to as "AND($A_0'$, $B_0'$)"), and the logical inversion of the logical add of the logical signals $A_0$ and $B_0$ is taken (which will be referred to as "INV ·OR($A_0$, $B_0$)"). Subsequently, the logical inverse of the logical product of AND($A_0'$, $B_0'$) and the INV ·OR($A_0$, $B_0$) is taken (which will be referred to as "INV-AND_1"). Furthermore, the logical add of the INV-AND_1 and the logical inversion of BREAK_PWM control signals is taken (which will be referred to as "OR_1"). Subsequently, the logical products of the OR_1, and each of $A_0$, $A_0'$, $B_0$, and $B_0'$, are taken, serving as the final transistor control signals $A_1$, $A_1'$, $B_1$, and $B_1'$, respectively.

In the event that the PWM control logic circuit inputs signals such that no current is applied to the coil, to the additional logic circuit, and furthermore, a high-level BREAK_PWM control signal is input thereto, the additional logic circuit generates transistor control signals such that the coil is short-circuited. Specifically, in a case of the state wherein no current is applied to the coil, the PWM control logic circuit outputs transistor control signals of high-level $A_0'$ and $A_0$, and low-level $B_0'$ and $B_0$. In this case, in the event that a high-level BREAK_PWM control signal is input to the additional logic circuit, the high-level A0' and $A_0$ are converted into the low-level $A_1'$ and $A_1$, whereby the coil becomes short-circuited.

On the other hand, in the event that a low-level BREAK_PWM control signal is input to the additional logic circuit, the additional logic circuit outputs the transistor control signals from the PWM control logic circuit without change, whereby the coil is open-circuited during an off-period thereof.

FIG. 6 shows the output properties of the transistor control signals output from the additional logic circuit in the event that a high-level BREAK_PWM control signal is input, along with the coil current waveform properties, and the torque output properties.

In the event that the coil is short-circuited during an off-period thereof, the period required for the coil current returning to zero increases due to transient response (described above). Accordingly, in the event that the operation wherein a current is applied to the coil, and the operation wherein the coil is short-circuited, are alternately repeated, the next current application to the coil is started prior to the current returning to zero during the off-period of the coil, and accordingly, the maximal current of the coil gradually increases, for each time switching operation between the state wherein current is applied to the coil, and the state wherein no current is applied to the coil, is repeated, as shown in the drawing. In the same way, the effective value $I_{eff}$ of the coil current gradually increases as shown in the drawing.

On the other hand, the output torque T of the motor is represented by the value wherein the coil current is multiplied by the torque coefficient $K_t$ ($T=K_t \cdot I$) Accordingly, in the event that switching operation between the state wherein the current is applied to the coil, and the state wherein the coil is short-circuited, is repeated, the effective value of the motor torque increases due to an increase of the coil current.

That is to say, the motor coil is short-circuited during off-period, and accordingly, immediate decay of the current (more precisely, the flow of charges), which flows in the coil of the motor, is prevented, thereby reducing loss of the torque. Furthermore, this prevents irregularity in the torque due to cogging.

That is to say, in the event that the coil is short-circuited during off-period, the motor has a kind of viscosity resistance, as described above. However, in the event that such a motor is employed in a robot, a problem occurs that the robot has no compliance from braking due to the coil being short-circuited.

Accordingly, with the present embodiment, the additional logic circuit converts the logical signals output from the PWM control logic circuit based upon the BREAK_BWM control signals, so as to control the ratio of the state wherein the coil is open-circuited, as to the state wherein the coil is short-circuited, during off-period of the coil.

Note that the transient response properties of the coil current in a case of the coil being open-circuited during an off-period of the coil, are represented by the Expression (2). On the other hand, the transient response properties of the coil current in a case of the coil being short-circuited, are represented by the Expression (5). In the event that switching operation is performed between the state wherein the coil is open-circuited, and the state wherein the coil is short-circuited, during an off-period of the motor coil, under the PWM control, the properties of the coil current are represented by the mixture value of the properties of the coil current in a case of the coil being short-circuited, and in a case of the coil being open-circuited, calculated based upon the duty ratio thereof.

Figure 7:
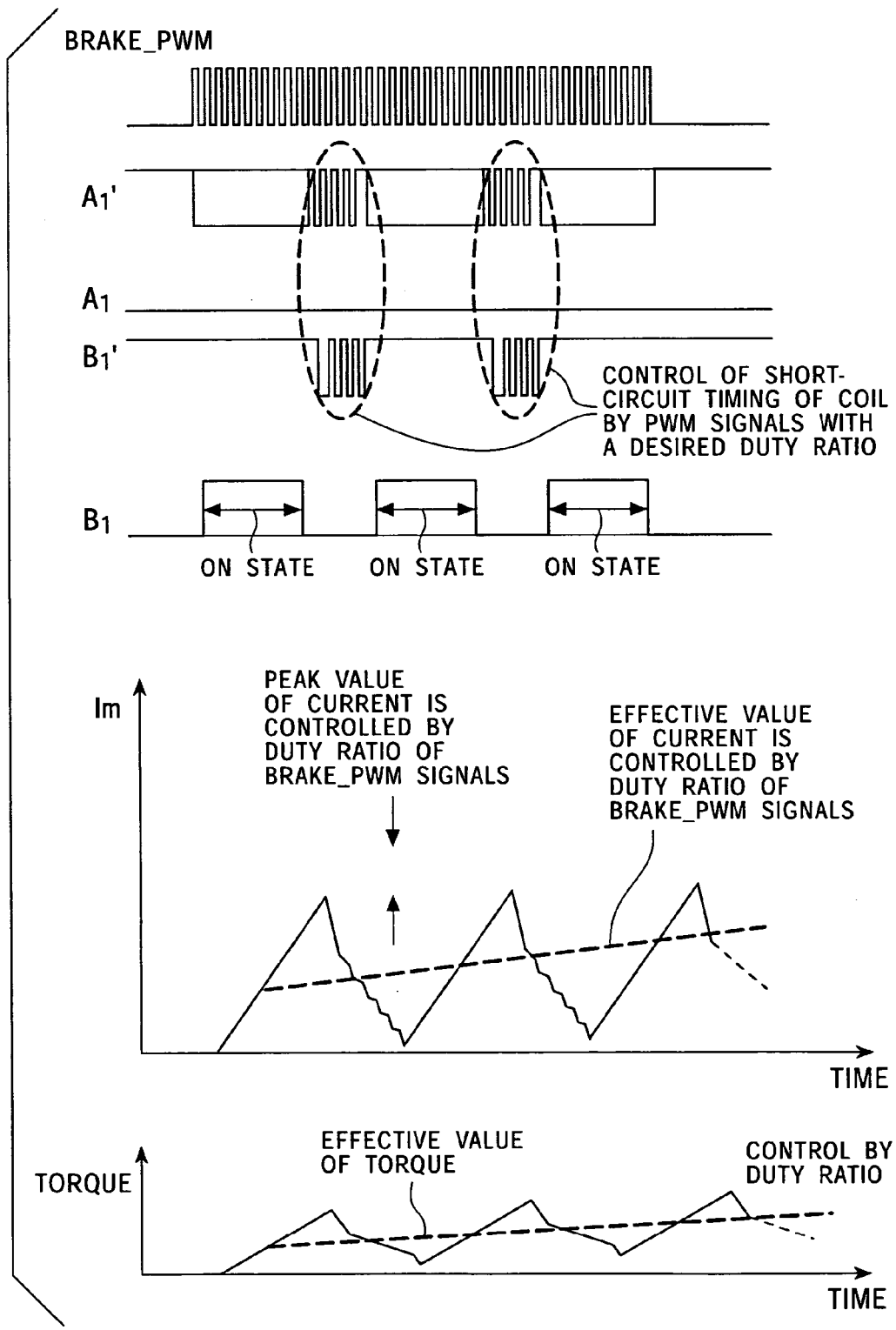
FIG. 7 is a diagram which shows output properties of control signals for each transistor, converted by the additional logic circuit, along with the coil current waveform property and the torque output property, in the event that a BREAK_PWM signal with a predetermined duty ratio is input to the additional logic circuit for performing PWM control.

FIG. 7 shows the output properties of the transistor control signals for performing PWM control, converted by the additional logic circuit based upon BREAK_PWM control signals with a predetermined duty ratio, along with the coil current waveform properties and the torque output properties.

In the event that the coil is short-circuited during off-period of the coil, the time required for the coil current returning to zero increases due to transient response. Conversely, in the event that the coil is short-circuited during off-period of the coil, the time required for the coil current returning to zero is reduced. In the event of performing PWM control using the control signals converted by the additional logic circuit based upon BREAK_PWM control signals, the properties of the coil current are represented by the mixture of the properties of the state wherein the coil is open-circuited, and the state wherein the coil is short-circuited, during off-periods of the coil, calculated based upon a duty ratio of the BREAK_PWM control signals.

Accordingly, as shown in the drawing, in the event that the operation wherein a current is applied to the coil, and the operation wherein the coil is short-circuited, are alternately repeated, the next current application to the coil is started prior to the coil current returning to zero during the off-period of the coil. While the maximal current of the coil gradually increases, for each time switching operation between the state wherein current is applied to the coil, and the state wherein no current is applied to the coil, is repeated, the gradient of the maximal current as to time is generally proportional to the duty ratio of the BREAK_PWM control signals, i.e., the ratio of the width of the high-level BREAK_PWM control signals. In the same way, while the effective value $I_{eff}$ of the coil current gradually increases as shown in the drawing, the gradient thereof is generally proportional to the duty ratio of the BREAK_PWM control signals, i.e., the ratio of the width of the high-level BREAK_PWM control signals.

On the other hand, the output torque T of the motor is represented by the value wherein the coil current is multiplied by the torque coefficient $K_t$ ($T=K_t \cdot I$), the effective value of the motor torque increases due to an increase of the coil current in the event that the state wherein current is applied to the coil, and the state wherein no current is applied to the coil, are alternately repeated, as can be understood from the drawing. In this case, the gradient of the motor torque as to time is generally proportional to the ratio of the duty ratio, i.e., the ratio of the width of the high-level BREAK_PWM control signals. In the same way, the viscosity coefficient, which determines the viscosity resistance occurring due to the counter electromotive force of the motor coil, is proportional to the ratio of the width of the high-level BREAK_PWM control signals. That is to say, the effective value of the motor torque, and the viscosity coefficient, which determines the viscosity resistance, can be dynamically controlled by adjusting the duty ratio of the BREAK_PWM control signals.

As described above, with the present embodiment, the logical control signals output from the PWM control logic circuit is converted by the additional logic circuit based upon the adjusted duty ratio of the BREAK_PWM control signals, thereby controlling the ratio of the state wherein the coil is open-circuited, as to the state wherein the coil is short-circuited, during off-period of the motor coil, according to the desired mechanical properties.

Thus, the present invention eliminates the problem of loss of the torque due to decay of the current (more precisely, the flow of charges), which flows in the coil of the motor, during the period of the coil being open-circuited, the problem of irregularity in torque due to cogging, and the problem of shortage of compliance (mechanical compliance) from braking due to the coil being short-circuited during the off-period of the motor coil, at the same time.

Figure 8:
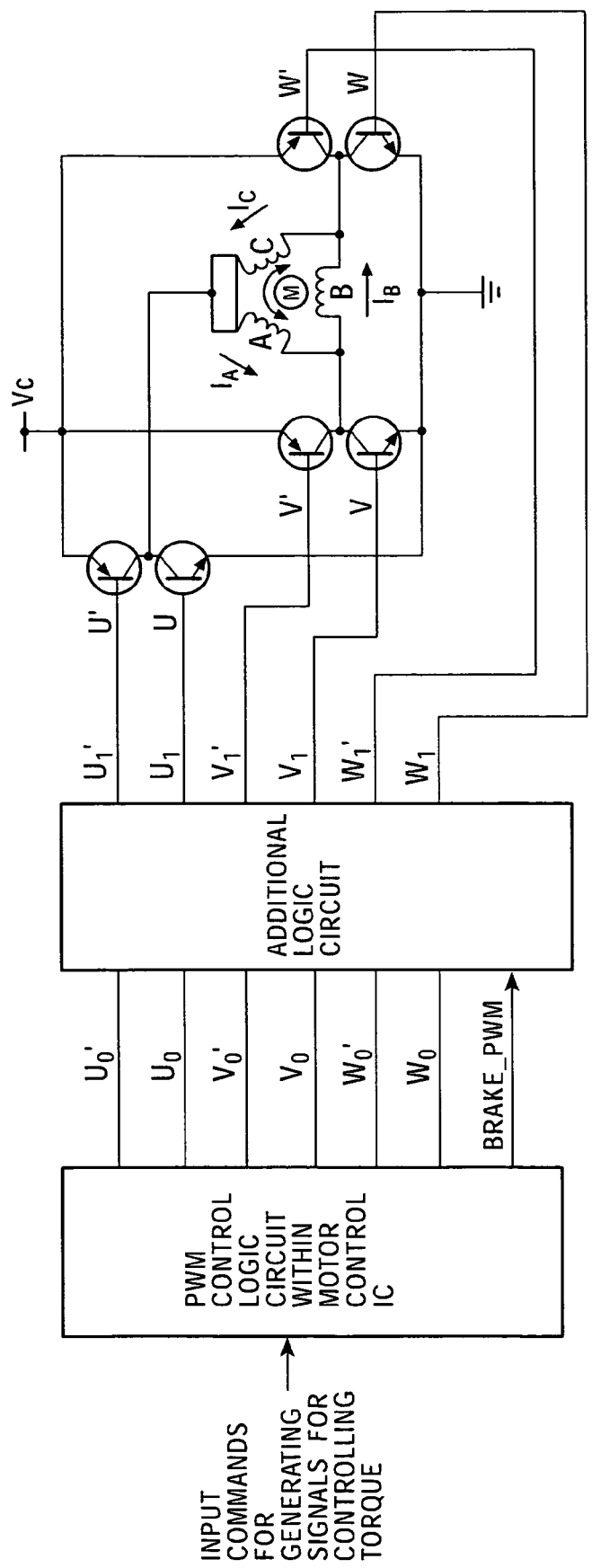
FIG. 8 is a configuration example of an equivalent circuit of a current control circuit for supplying coil current in a case of applying the control mechanism for coil current according to the present invention to a three-phase motor.

FIG. 8 shows a configuration example of an equivalent circuit of a current control circuit for supplying coil current to the three-phase motors wherein the control mechanism for the coil current according to the present invention is applied.

In the example shown in the drawing, the stator coil has a configuration employing the delta-connection. On the other hand, the current control circuit shown in the drawing has a full-bridge configuration wherein a first circuit for controlling the U-phase magnetic flux distribution, formed of a pnp transistor U' and an npn transistor U, connected in the forward direction, a second circuit for controlling the V-phase magnetic flux distribution, having the same configuration formed of a pnp transistor V' and an npn transistor V, connected in the forward direction, a third circuit for controlling the W-phase magnetic flux distribution, having the same configuration formed of a pnp transistor W' and an npn transistor W, connected in the forward direction, are connected in parallel. Furthermore, each of the collectors of the pnp transistors U', V', and W', of these three circuits each of which are formed of a pair of transistors connected in the forward direction, are connected to the power supply voltage Vcc, as well as the emitters of the other npn transistors U, V, and W, being connected to the ground GND, in parallel. Furthermore, one end of a coil A is connected to the node between the transistors U' and U, and the other end thereof is connected to the node between the transistors V' and V. In the same way, one end of a coil B is connected to the node between the transistors V' and V, and the other end thereof is connected to the node between the transistors W' and W.

In the same way, one end of a coil C is connected to the node between the transistors W' and W, and the other end thereof is connected to the node between the transistors U' and U.

The PWM control logic circuit generates current commands for the aforementioned coils A, B, and D, for each phase, based upon current commands for controlling the stator magnetic field (torque commands) IO from an unshown central control unit so as to perform switching-control of transistors U', U, V', V, W', and W, with PWM method. Thus, switching operation between the state wherein each of coil currents $I_A$, $I_B$, and $I_C$, are applied to the corresponding phase coil, and the state wherein no current is applied to the coil, is alternately formed for each of the coils.

On the other hand, FIG. 9 shows a configuration of the bridge portion employing the star connection with three-phase coils, not the delta connection. In this case, as shown in the drawing, one ends the phase-coils A, B, and C, are terminated, as well as the other ends thereof are serially connected to the nodes between the pnp transistor U' and the npn transistor U, between the pnp transistor V' and the npn transistor V, and between the pnp transistor W' and the npn transistor W, respectively.

Again, description will be made with reference to FIG. 8. The PWM control logic circuit generates current commands for the aforementioned coils A, B, and C, for each phase, based upon current commands for controlling the stator magnetic field (torque commands) IO from an unshown central control unit so as to perform switching-control of transistors U', U, V', V, W', and W, with PWM method. Thus, switching operation between the state wherein each of coil currents $I_A$, $I_B$, and $I_C$, are applied to the corresponding phase coil, and the state wherein no current is applied to the coil, is alternately formed for each of the coils.

That is to say, upon turning on the transistors U' and V, as well as turning off the transistors U and V', current is applied to the coil A, whereby the current $I_A$ flows in the direction of the arrow in FIG. 8. Subsequently, upon turning off the transistors U' and V, the coil A goes off.

In the same way, upon turning on the transistors V' and W, as well as turning off the transistors V and W', current is applied to the coil B, whereby the current $I_B$ flows in the direction of the arrow in FIG. 8. Subsequently, upon turning off the transistors V' and W, the coil B goes off.

In the same way, upon turning on the transistors W' and U, as well as turning off the transistors W and U', current is applied to the coil C, whereby the current $I_C$ flows in the direction of the arrow in FIG. 8. Subsequently, upon turning off the transistors W' and U, the coil C goes off.

The controller according to the present embodiment further includes an additional logic circuit for converting the control signals output from the PWM control logic circuit for controlling on/off operations of the transistors U', U, V', V, W', and W.

The aforementioned additional logic circuit converts the control signals output from the PWM control logic circuit based upon the BREAK_PWM signals, for performing switching operation between the state wherein the coil is open-circuited, and the state wherein the coil is short-circuited, during off-periods of the coil. That is to say, the toothcomb-waveform signals are input to the additional logic circuit during the period wherein all the coils are open-circuited, thereby generating intermittent short circuit in the coils.

Figure 10:
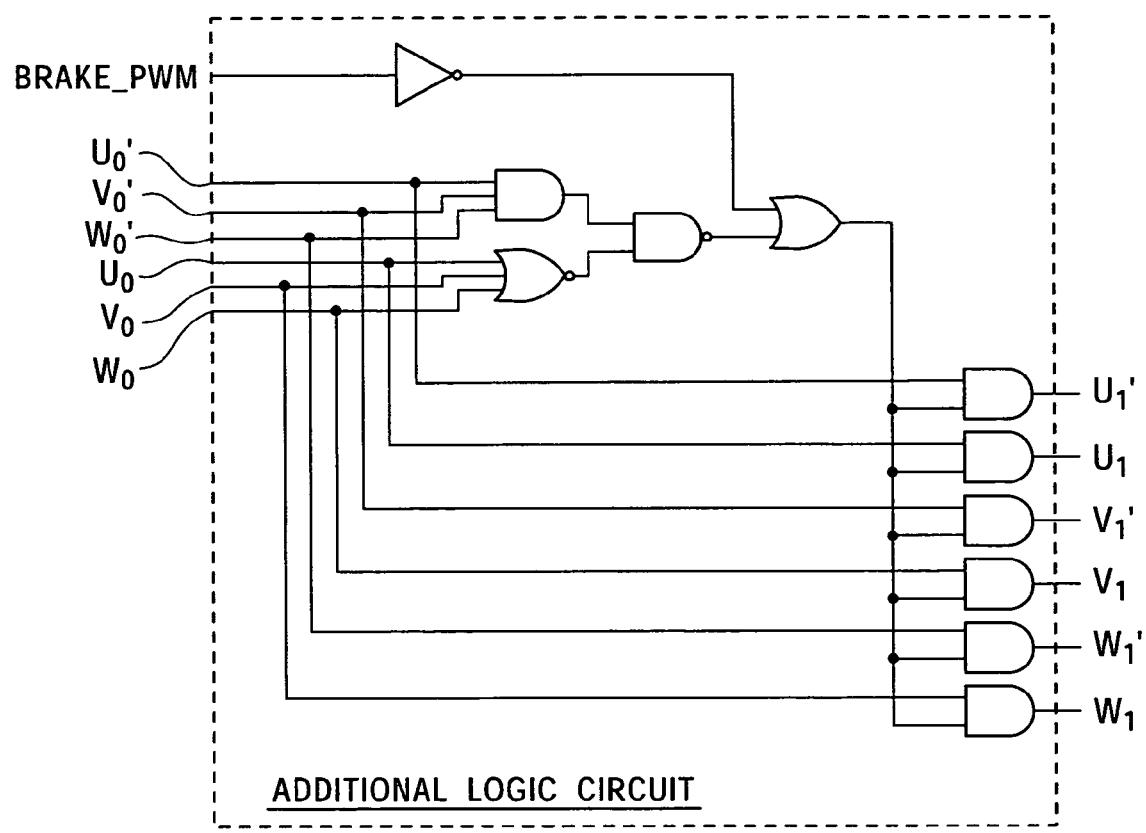
FIG. 10 is a diagram which shows a configuration of the additional logic circuit.

FIG. 10 shows a specific circuit configuration of the additional logic circuit. With the additional logic circuit shown in FIG. 10, the logical control signals $U_0$, $U_0'$, $V_0$, $V_0'$, $W_0$, and $W_0'$, output from the PWM control logic circuit, for controlling the transistors W, W', V, V', W, and W', respectively, are converted into the final logical control signals, as follows.

First, the logical product of the logical signals $U_0'$, $V_0'$, and $W_0'$ is taken (which will be referred to as "AND($U_0'$, $V_0'$, $W_0'$)"), and the logical inversion of the logical add of the logical signals $U_0$, $V_0$, and $W_0$ is taken (which will be referred to as "INV·OR($U_0$, $V_0$, $W_0$)"). Subsequently, the logical inverse of the logical product of AND($U_0'$, $V_0'$, $W_0'$) and the INV·OR($U_0$, $V_0$, $W_0$) is taken (which will be referred to as "INV-AND_1"). Furthermore, the logical add of the INV-AND_1 and the logical inversion of BREAK_PWM control signals is taken (which will be referred to as "OR_1"). Subsequently, the logical products of the OR_1, and each of $U_0$, $U_0'$, $V_0$, $V_0'$, $W_0$, and $W_0'$, are taken, serving as the final transistor control signals $U_1$, $U_1'$, $V_1$, $V_1'$, $W_1$, and $W_1'$, respectively.

In the event that the high-level BREAK_PWM control signals are input to the additional logic circuit, the additional logic circuit converts the control signals output from the PWM control logic circuit such that the coils are short circuited during off-periods of the coils. The PWM control logic circuit outputs the transistor control signals of the high-level $U'_0$, and $V_0'$, and the low-level $U_0$, and $V_0$, during off-periods of the coil A. On the other hand, in the event that the toothcomb-waveform BREAK_PWM control signals (mixture signals of the high-level and low-level BREAK_PWM control signals) are input to the additional logic circuit, the additional logic circuit converts the high-level $U'_0$, and $V_0'$ into the low-level $U_1$, and $V_1$, during the periods of the high-level BREAK_PWM control signals, thereby generating intermittent short circuit in the coil A.

In the same way, the PWM control logic circuit outputs the transistor control signals of the high-level $V'_0$, and $W_0'$, and the low-level $V_0$, and $W_0$, during off-periods of the coil B. On the other hand, in the event that the toothcomb-waveform BREAK_PWM control signals (mixture signals of the high-level and low-level BREAK_PWM control signals) are input to the additional logic circuit, the additional logic circuit converts the high-level $V'_0$, and $W_0'$ into the low-level $V_1'$, and $W_1'$, during the periods of the high-level BREAK_PWM control signals, thereby generating intermittent short circuit in the coil B.

In the same way, the PWM control logic circuit outputs the transistor control signals of the high-level $W_0'$, and $U_0'$, and the low-level $W_0$, and $U_0$, during off-periods of the coil C. On the other hand, in the event that the toothcomb-waveform BREAK_PWM control signals (mixture signals of the high-level and low-level BREAK_PWM control signals) are input to the additional logic circuit, the additional logic circuit converts the high-level $W'_0$, and $U_0'$ into the low-level $W_1'$, and $U_1'$, during the periods of the high-level BREAK_PWM control signals, thereby generating intermittent short circuit in the coil C.

On the other hand, in the event that the low-level BREAK_PWM control signals are input to the additional logic circuit, the additional logic circuit outputs the transistor control signals from the PWM control logic circuit without change, and accordingly, the state wherein the coils A, B, and C, are open-circuited during off-periods of the coils, is maintained.

In the event that the coil is short-circuited during an off-period of the coil, time required for the coil current returning to zero increases due to transient response from the inductance component L of the coil and the DC resistance component R thereof (described above). In this case, in the event that switching operation is repeated between the state wherein current is applied to the coil and the state wherein coil is short-circuited, the next current application to the coil is started prior to the coil current returning to zero during the off-period of the coil, and accordingly, the maximal current of the coil gradually increases, for each time switching operation between the state wherein current is applied to the coil, and the state wherein no current is applied to the coil, is repeated. In the same way, the effective value $I_{eff}$ of the coil current gradually increases as shown in the drawing.

On the other hand, the output torque T of the motor is represented by the value wherein the coil current is multiplied by the torque coefficient $K_t$ ($T=K_t·I$). Accordingly, in the event that switching operation between the state wherein the current is applied to the coil, and the state wherein the coil is short-circuited, is repeated, the effective value of the motor torque increases due to an increase of the coil current. That is to say, the motor coil is short-circuited during off-period, and accordingly, immediate decay of the current (more precisely, the flow of charges), which flows in the coil of the motor, is prevented, thereby reducing loss of the torque. Furthermore, this prevents irregularity in the torque due to cogging.

On the other hand, in the event that the coil is short-circuited during off-period, the motor has a kind of viscosity resistance, as described above. However, in the event that such a motor is employed in a robot, a problem occurs that the robot has no compliance (mechanical compliance) from braking due to the coil being short-circuited.

Accordingly, with the controller according to the present embodiment, the additional logic circuit converts the control logical signals output from the PWM control logic circuit based upon the BREAKE_PWM control signals so as to control the ratio of the state wherein the coil is open-circuited, as to the state wherein the coil is short-circuited, during off-periods of the motor coil.

Note that the transient response properties of the coil current in a case of the coil being open-circuited during an off-period of the coil, are represented by the Expression (2). On the other hand, the transient response properties of the coil current in a case of the coil being short-circuited, are represented by the Expression (5). In the event that switching operation is performed between the state wherein the coil is open-circuited, and the state wherein the coil is short-circuited, during an off-period of the motor coil, under the PWM control, the properties of the coil current are represented by the mixture value of the properties of the coil current in a case of the coil being short-circuited, and in a case of the coil being open-circuited, calculated based upon the duty ratio thereof.

Figure 11:
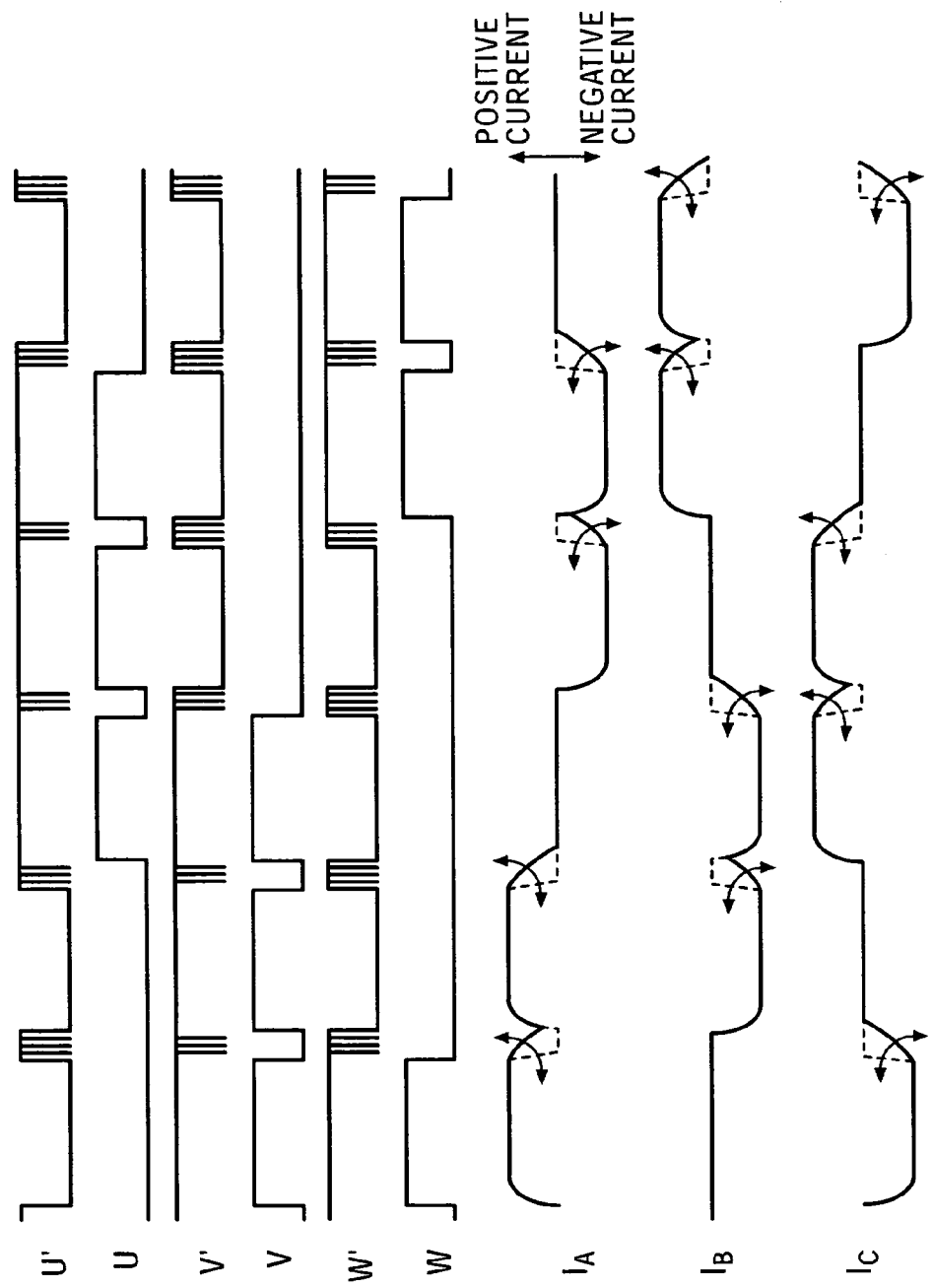
FIG. 11 is a diagram which shows output properties of control signals for each transistor, converted by the additional logic circuit, along with the coil current waveform properties, in the event that a BREAK_PWM signal with a predetermined duty ratio is input to the additional logic circuit for performing PWM control.

FIG. 11 shows the output properties of the transistor control signals for performing PWM control, converted by the additional logic circuit based upon BREAK_PWM control signals with a predetermined duty ratio, along with the coil current waveform.

In the event that the coil is short-circuited during off-period of the coil, the time required for the coil current returning to zero increases due to transient response. Conversely, in the event that the coil is open-circuited during off-period of the coil, the time required for the coil current returning to zero is reduced. In the event of performing PWM control using the control signals converted by the additional logic circuit based upon BREAK_PWM control signals, the properties of the coil current are represented by the mixture of the properties of the state wherein the coil is open-circuited, and the state wherein the coil is short-circuited, during off-periods of the coil, calculated based upon a duty ratio of the BREAK_PWM control signals.

In the event that the switching operation between the state wherein current is applied to the coil, and the state wherein the coil is short-circuited, is repeated, the next current application to the coil is started prior to the coil current returning to zero during the off-period of the coil, and accordingly, the maximal current of the coil gradually increases, for each time switching operation between the state wherein current is applied to the coil, and the state wherein no current is applied to the coil, is repeated. Note that the gradient of the maximal current of the coil as to time is generally proportional to the duty ratio of the BREAK_PWM control signals, i.e., the ratio of the width of the high-level BREAK_PWM control signals. In the same way, while the effective value $I_{eff}$ of the coil current gradually increases, the gradient thereof is generally proportional to the duty ratio of the BREAK_PWM control signals, i.e., the ratio of the width of the high-level BREAK_PWM control signals.

On the other hand, the output torque T of the motor is represented by the value wherein the coil current is multiplied by the torque coefficient $K_t$ ($T=K_t \cdot I$). Accordingly, in the event that switching operation between the state wherein current is applied to the coil, and the state wherein no current is applied to the coil, is repeated, the effective value of the motor torque increases due to an increase of the coil current. The gradient of the effective value of the motor torque as to time is generally proportional to the duty ratio of the BREAK_PWM control signals, i.e., the ratio of the width of the high-level BREAK_PWM control signals. In the same way, the viscosity coefficient, which determines the viscosity resistance occurring due to the counter electromotive force of the motor coil, is proportional to the ratio of the width of the high-level BREAK_PWM control signals. That is to say, the effective value of the motor torque, and the viscosity coefficient, which determines the viscosity resistance, can be dynamically controlled by adjusting the duty ratio of the BREAK_PWM control signals.

Thus, the two properties as follows can be controlled by adjusting the duty ratio of the BREAK_PWM control signals.

(1) The viscosity coefficient, which determines the viscosity resistance of the motor, can be controlled.

(2) The current (the flow of charges), which flows in each coil during the off-period of the coils A, B, and C, for each phase, can be controlled (see the arrows in FIG. 11).

In this case, in the event that the duty ratio of the BREAK_PWM control signals is adjusted so as to increase the viscosity coefficient, the motor exhibits the improved retentivity, thereby reducing irregularity in torque due to cogging or the like. Furthermore, in a case of employing the controller according to the present embodiment for a servo motor, the compliance with external force can be controlled.

As described above, the additional logic circuit converts the control logical signals output from the PWM control logic circuit based upon the BREAK_PWM control signals with a predetermined duty ratio, for performing PWM control, thereby controlling the ratio of the state wherein the coil is open-circuited, as to the state wherein the coil is short-circuited, during an off-period of the coil, according to the desired mechanical properties.

Thus, the present invention eliminates the problem of loss of the torque due to decay of the current (more precisely, the flow of charges), which flows in the coil of the motor, during the period of the coil being open-circuited, the problem of irregularity in torque due to cogging, and the problem of shortage of compliance (mechanical compliance) from braking due to the coil being short-circuited during the off-period of the motor coil, at the same time.

Figure 12:
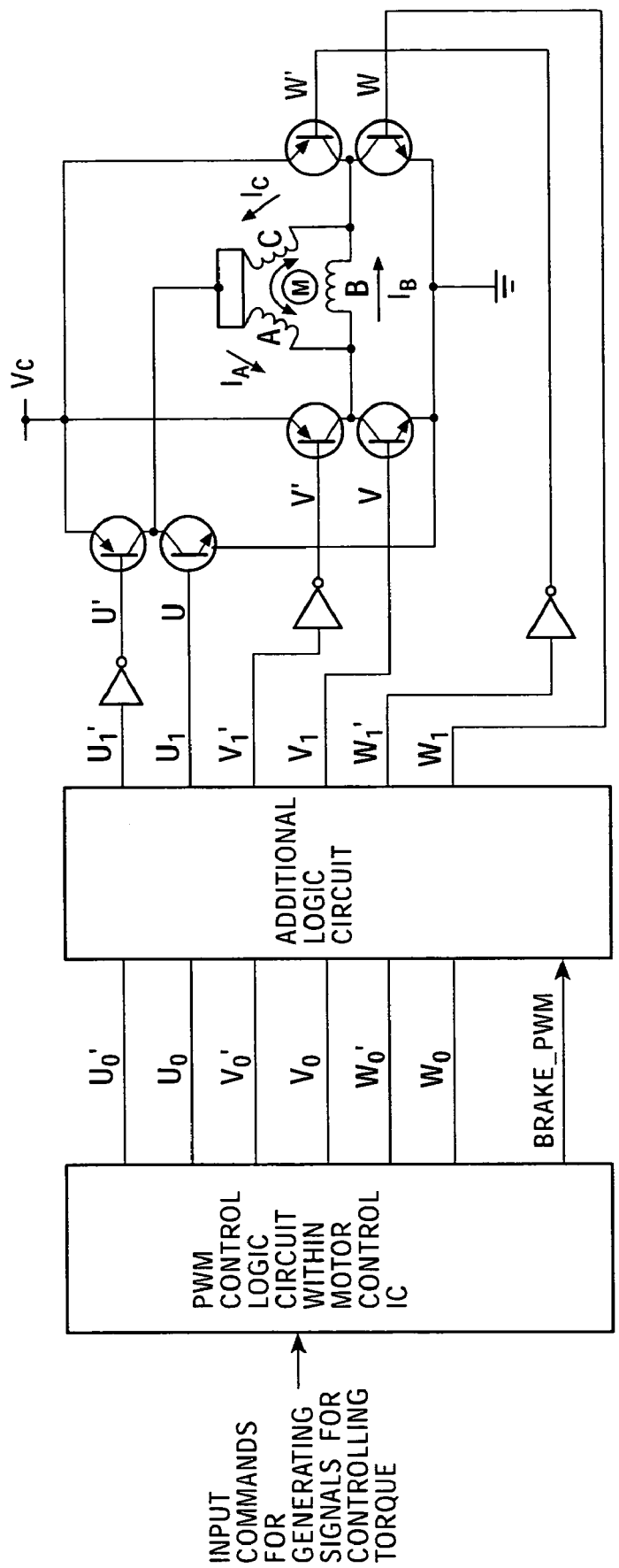
FIG. 12 is another configuration example of an equivalent circuit of a current control circuit for supplying coil current in a case of applying the control mechanism for coil current according to the present invention to a three-phase motor.

FIG. 12 shows another configuration example of an equivalent circuit of a current control circuit for supplying coil current to the three-phase motors wherein the control mechanism for the coil current according to the present is applied.

In the example shown in the drawing, the stator coil has a configuration employing the delta-connection. The PWM control logic circuit generates current commands for the aforementioned coils A, B, and C, for each phase, based upon current commands for controlling the stator magnetic field (torque commands) IO from an unshown central control unit so as to perform switching-control of transistors U', U, V', V, W', and W, with PWM method.

The current control circuit shown in FIG. 12 has a full-bridge configuration wherein a first circuit for controlling U-phase magnetic flux distribution, formed of a pnp transistor U' and an npn transistor U, connected in the forward direction, a second circuit for controlling V-phase magnetic flux distribution, having the same configuration formed of a pnp transistor V' and an npn transistor V, connected in the forward direction, a third circuit for controlling W-phase magnetic flux distribution, having the same configuration formed of a pnp transistor W' and an npn transistor W, connected in the forward direction, are connected in parallel. Furthermore, each of the collectors of the pnp transistors U', V', and W', of these three circuits each of which are formed of a pair of transistors connected in the forward direction, are connected to the power supply voltage Vcc, as well as the emitters of the other npn transistors U, V, and W, being connected to the ground GND, in parallel. Furthermore, one end of a coil A is connected to the node between the transistors U' and U, and the other end thereof is connected to the node between the transistors V' and V. In the same way, one end of a coil B is connected to the node between the transistors V' and V, and the other end thereof is connected to the node between the transistors W' and W. In the same way, one end of a coil C is connected to the node between the transistors W' and W, and the other end thereof is connected to the node between the transistors U' and U.

Note that FIG. 9 shows a configuration of the bridge portion employing the star connection with three-phase coils, not the delta connection (described above).

The PWM control logic circuit generates current commands for the coils, based upon current commands for controlling the stator magnetic field (torque commands) IO from an unshown central control unit so as to perform switching-control of transistors U', U, V', V, W', and W, with PWM method, thereby repeating switching operation between the state wherein coil currents $I_A$, $I_B$, and $I_C$, are applied to the coils, and the state wherein no current is applied to the coils.

That is to say, upon turning on the transistors U' and V, as well as turning off the transistors U and V', current is applied to the coil A, whereby the coil current $I_A$ flows in the direction of the arrow in FIG. 12. Subsequently, upon turning off the transistors U' and V, the coil A goes off.

In the same way, upon turning on the transistors V' and W, as well as turning off the transistors V and W', current is applied to the coil B, whereby the coil current $I_B$ flows in the direction of the arrow in FIG. 12. Subsequently, upon turning off the transistors V' and W, the coil B goes off.

In the same way, upon turning on the transistors W' and U, as well as turning off the transistors W and U', current is applied to the coil C, whereby the coil current $I_C$ flows in the direction of the arrow in FIG. 12. Subsequently, upon turning off the transistors W' and U, the coil C goes off.

In the example shown in the drawing, control logical signals inverted by the inverters are input to the transistors U', V', and W'. That is to say, with the configuration shown in the drawing, in the event of off-periods of all the coils, all the coil terminals are short-circuited to the power supply voltage $V_{cc}$.

Furthermore, the additional logic circuit converts the control signals output from the PWM control logic circuit based upon toothcomb-waveform BREAK_PWM signals, during the off-periods of the coils wherein all the coil terminals are short-circuited to the power supply voltage $V_{cc}$, thereby intermittently generating open-circuit states in the coils.

Figure 13:
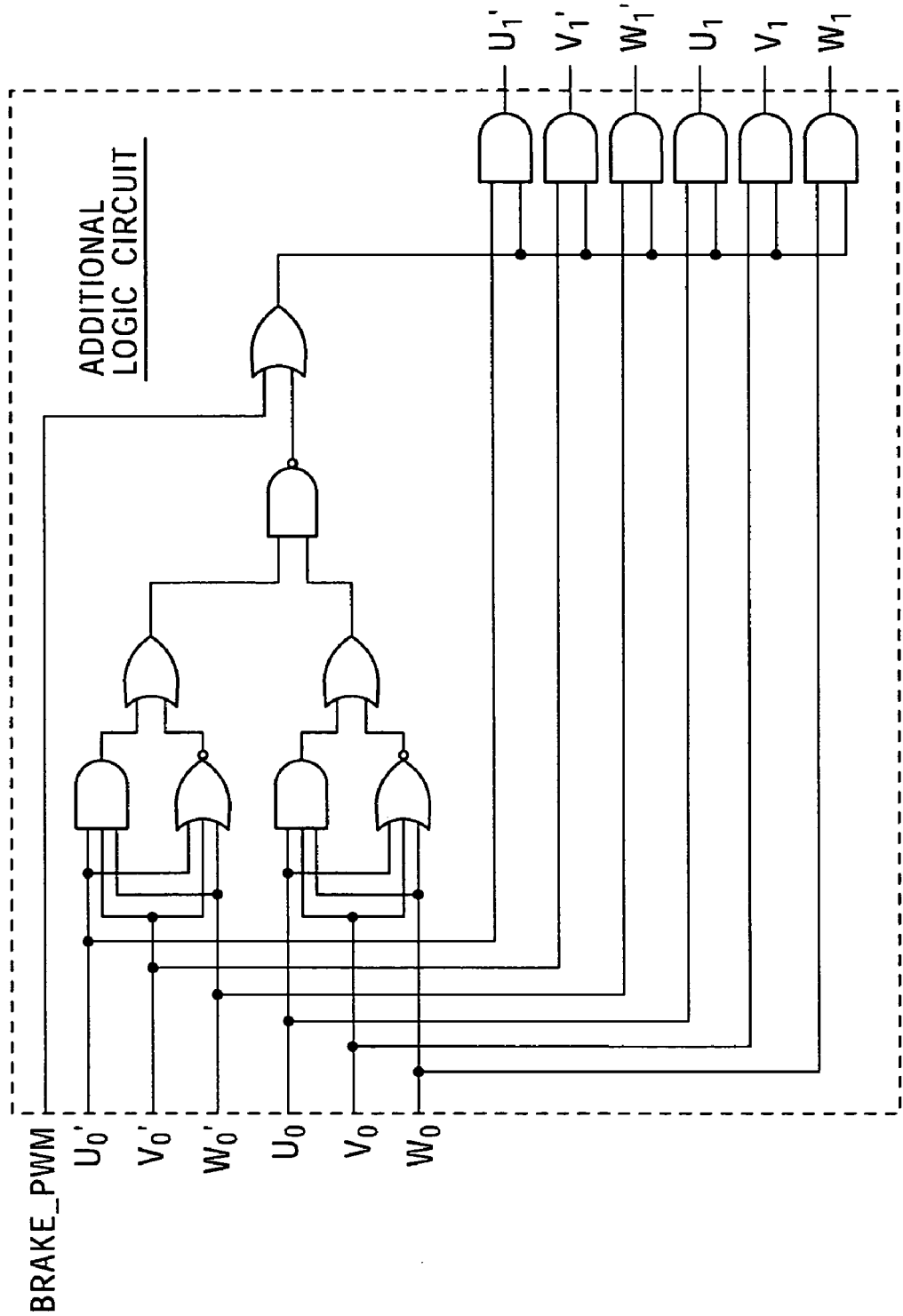
FIG. 13 is a diagram which shows a specific circuit configuration of the additional logic circuit.

FIG. 13 shows a specific circuit configuration of the additional logic circuit. With the additional logic circuit shown in FIG. 13, the logical control signals $U_0$, $U_0'$, $V_0$, $V_0'$, $W_0$, and $W_0'$, output from the PWM control logic circuit, for controlling the transistors W, W', V, V', W, and W', respectively, are converted into the final logical control signals, as follows.

First, the logical product of the logical signals $U_0'$, $V_0'$, and $W_0'$ is taken (which will be referred to as "AND($U_0'$, $V_0'$, $W_0'$)"), and the logical inversion of the logical add of the logical signals $U_0'$, $V_0'$, and $W'_0$ is taken (which will be referred to as "INV·OR($U_0'$, $V_0'$, $W_0'$)"). Subsequently, the logical add of AND($U_0'$, $V_0'$, $W_0'$) and the INV·OR($U_0'$, $V_0'$, $W_0'$) is taken, which will be referred to as "first logical add".

Second, the logical product of the logical signals $U_0$, $V_0$, and $W_0$ is taken (which will be referred to as "AND($U_0$, $V_0$, $W_0$)"), and the logical inversion of the logical add of the logical signals $U_0$, $V_0$, and $W_0$ is taken (which will be referred to as "INV·OR($U_0$, $V_0$, $W_0$) "). Subsequently, the logical add of AND($U_0$, $V_0$, $W_0$) and the INV·OR($U_0$, $V_0$, $W_0$) is taken, which will be referred to as "second logical add".

Furthermore, the logical inversion of the logical product of the first logical add and the second logical add is taken (which will be referred to as "INV-AND_1"). Furthermore, the logical add of the INV-AND_1 and the BREAK_PWM control signals is taken (which will be referred to as "OR_1"). Subsequently, the logical products of the OR_1, and each of $U_0$, $U_0'$, $V_0$, $V_0'$, $W_0$, and $W_0'$, are taken, serving as the final transistor control signals $U_1$, $U_1'$, $V_1$, $V_1'$, $W_1$, and $W_1'$, respectively.

In the event that the low-level BREAK_PWM control signals are input to the additional logic circuit, the additional logic circuit converts the control signals output from the PWM control logic circuit such that the coils are open circuited during off-periods of the coils. The PWM control logic circuit outputs the transistor control signals of the low-level $U'_0$, and $V_0'$, and the low-level $U_0$, and $V_0$, during off-periods of the coil A. On the other hand, in the event that the toothcomb-waveform BREAK_PWM control signals (mixture signals of the high-level and low-level BREAK_PWM control signals) are input to the additional logic circuit, the additional logic circuit converts the low-level U'$_0$, and $V_0'$ into the high-level $U_1'$, and $V_1'$, during the periods of the low-level BREAK_PWM control signals, thereby generating intermittent open circuit in the coil A.

In the same way, the PWM control logic circuit outputs the transistor control signals of the low-level $V'_0$, and $W_0'$, and the low-level $V_0$, and $W_0$, during off-periods of the coil B. On the other hand, in the event that the toothcomb-waveform BREAK_PWM control signals (mixture signals of the high-level and low-level BREAK_PWM control signals) are input to the additional logic circuit, the additional logic circuit converts the low-level $V'_0$, and $W_0'$ into the high-level $V_1'$, and $W_1'$, during the periods of the low-level BREAK_PWM control signals, thereby generating intermittent open circuit in the coil B.

In the same way, the PWM control logic circuit outputs the transistor control signals of the low-level $W'_0$, and $U_0'$, and the low-level $W_0$, and $U_0$, during off-periods of the coil C. On the other hand, in the event that the toothcomb-waveform BREAK_PWM control signals (mixture signals of the high-level and low-level BREAK_PWM control signals) are input to the additional logic circuit, the additional logic circuit converts the low-level $W'_0$, and $U_0'$ into the high-level $W_1'$, and $U_1'$, during the periods of the low-level BREAK_PWM control signals, thereby generating intermittent open circuit in the coil C.

On the other hand, in the event that the high-level BREAK_PWM control signals are input to the additional logic circuit, the additional logic circuit outputs the transistor control signals from the PWM control logic circuit without change, and accordingly, the state wherein the coils A, B, and C, are short-circuited during off-periods of the coils, is maintained.

Figure 14:
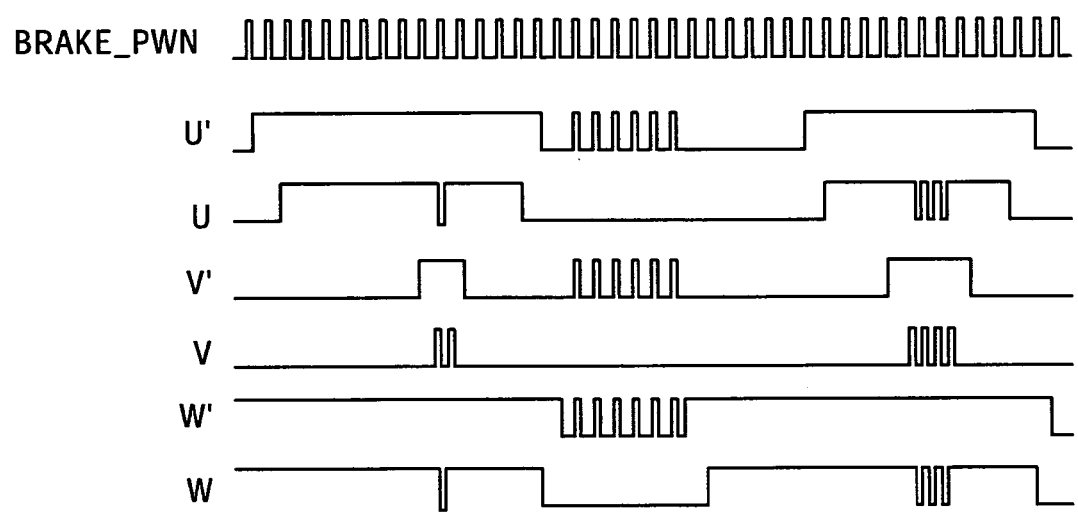
FIG. 14 is a diagram which shows the waveforms of the control signals for each transistor in the event that a BREAK_PWM signal with a predetermined duty ratio is input to the additional logic circuit so as to repeat switching between the state wherein the coils are open-circuited and the state wherein the coils are short-circuited during off-periods of the coils.

FIG. 14 is a timing chart which shows the waveforms of the transistor control signals $U_1$, $U_1'$, $V_1$, $V_1'$, $W_1$, and $W_1'$, converted by the additional logic circuit based upon the BREAK_PWM signals, wherein the state of the coil being open-circuited is included in the state of the coil being short-circuited at a predetermined timing during off-periods of the coils A, B, and C.

In the event that all the logical signals, $U_0$, $U_0'$, $V_0$, $V_0'$, $W_0$, and $W_0'$, for controlling switching operations of the corresponding transistors, input to the additional logic circuit, are at high-level, the additional logic circuit intermittently converts the high-level logical signals $U_0$, $V_0$, and $W_0$, into the low-level logical signals $U_1$, $V_1$, and $W_1$, respectively, at predetermined timing. That is to say, the additional logic circuit generates the control logical signals such that the state wherein the pnp transistors are off is maintained, and the state wherein the npn transistors which have been on are turned off is intermittently caused by masking the original logical signals with the BREAK_PWM signals, thereby generating the periods wherein the coils are open-circuited.

In the event that all the logical signals, $U_0$, $U_0'$, $V_0$, $V_0'$, $W_0$, and $W_0'$, for controlling switching operations of the corresponding transistors, input to the additional logic circuit, are at low-level, the additional logic circuit intermittently converts the low-level logical signals $U_0'$, $V_0'$, and $W_0'$, into the high-level logical signals $U_1'$, $V_1'$, and $W_1'$, respectively, at predetermined timing. That is to say, the additional logic circuit generates the control logical signals such that the state wherein the npn transistors are off is maintained, and the state wherein the pnp transistors which have been on are turned off is intermittently caused by masking the original logical signals with the BREAK_PWM signals, thereby generating the periods wherein the coils are open-circuited.

In the event that the switching operation between the state a current is applied to the coil, and the operation wherein the coil is short-circuited, is repeated, the next current application to the coil is started prior to the coil current returning to zero during the off-period of the coil. Accordingly, the maximal current of the coil gradually increases, for each time switching operation between the state wherein current is applied to the coil, and the state wherein no current is applied to the coil, is repeated. Note that the gradient of the maximal current of the coil as to time is generally proportional to the duty ratio of the BREAK_PWM control signals, i.e., the ratio of the width of the high-level BREAK_PWM control signals. In the same way, while the effective value $I_{eff}$ of the coil current gradually increases, the gradient thereof is generally proportional to the duty ratio of the BREAK_PWM control signals, i.e., the ratio of the width of the high-level BREAK_PWM control signals.

On the other hand, the output torque T of the motor is represented by the value wherein the coil current is multiplied by the torque coefficient $K_t$ ($T=K_t \cdot I$). Accordingly, in the event that switching operation between the state wherein current is applied to the coil, and the state wherein no current is applied to the coil, is repeated, the effective value of the motor torque increases due to an increase of the coil current. The gradient of the effective value of the motor torque as to time is generally proportional to the duty ratio of the BREAK_PWM control signals, i.e., the ratio of the width of the high-level BREAK_PWM control signals. In the same way, the viscosity coefficient, which determines the viscosity resistance occurring due to the counter electromotive force of the motor coil, is proportional to the ratio of the width of the high-level BREAK_PWM control signals. That is to say, the effective value of the motor torque, and the viscosity coefficient, which determines the viscosity resistance, can be dynamically controlled by adjusting the duty ratio of the BREAK_PWM control signals.

The controller according to the present embodiment employs BREAK_PWM signals with a carrier frequency around 10 through 100 times as great as with the PWM control signals. Thus, the two properties as follows can be controlled by adjusting the duty ratio of the BREAK_PWM control signals.

(1) The viscosity coefficient, which determines the viscosity resistance of the motor, can be controlled.

(2) The current (the flow of charges), which flows in each coil during the off-period of the coils A, B, and C, for each phase, can be controlled.

In this case, in the event that the duty ratio of the BREAK_PWM control signals is adjusted so as to increase the viscosity coefficient, the motor exhibits the improved retentivity, thereby reducing irregularity in torque due to cogging or the like. Furthermore, in a case of employing the controller according to the present embodiment for a servo motor, the compliance with external force can be controlled.

As described above, the additional logic circuit converts the control logical signals output from the PWM control logic circuit based upon the BREAK_PWM control signals with a predetermined duty ratio, for performing PWM control, thereby controlling the ratio of the state wherein the coil is open-circuited, as to the state wherein the coil is short-circuited, during an off-period of the coil, according to the desired mechanical properties.

Thus, the present invention eliminates the problem of loss of the torque due to decay of the current (more precisely, the flow of charges), which flows in the coil of the motor, during the period of the coil being open-circuited, the problem of irregularity in torque due to cogging, and the problem of shortage of compliance (mechanical compliance) from braking due to the coil being short-circuited during the off-period of the motor coil, at the same time.

Figure 15:
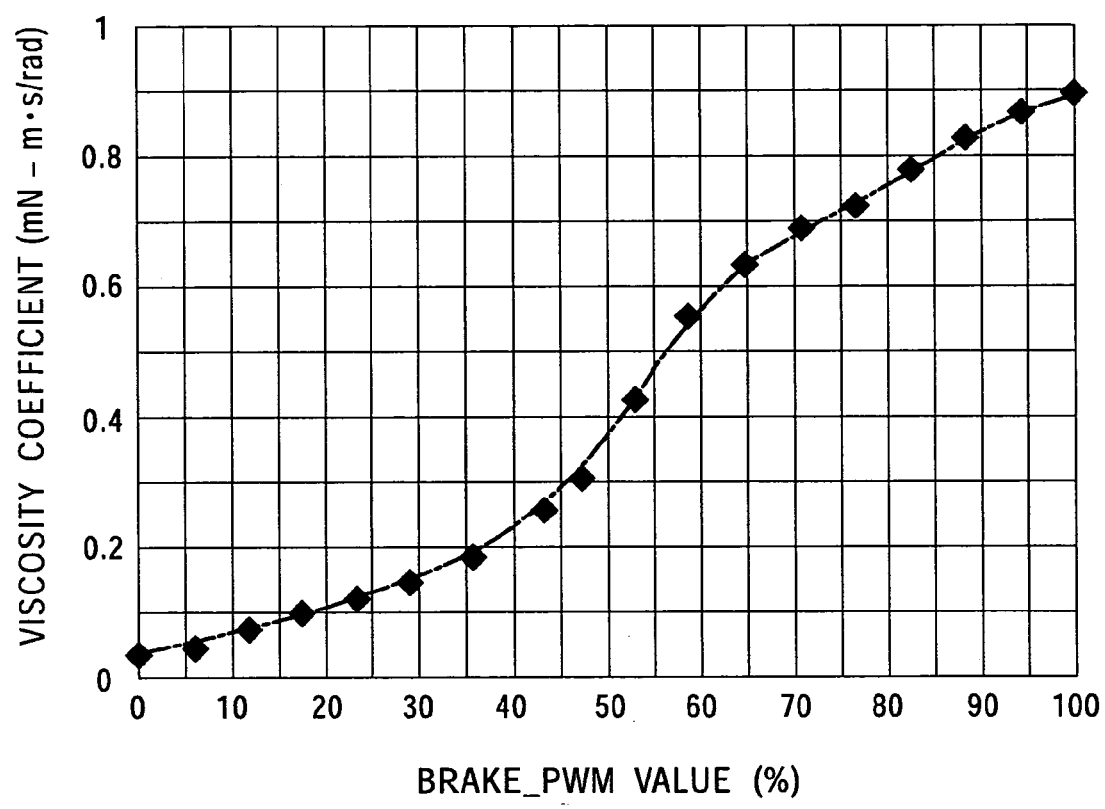
FIG. 15 is a chart which shows the relation between the duty ratio of the BREAK_PWM signal and the viscosity coefficient in a case of employing the current control method for a three-phase motor shown in FIG. 12.

As described above, with the present embodiment, the viscosity resistance of the motor can be controlled by adjusting the duty ratio of the BREAK_PWM signals. FIG. 15 shows the relation between the duty ratio of the BREAK_PWM signals, i.e., the ratio of the width of the high-level BREAK_PWM signals, and the viscosity coefficient, in a case of employing the current control method for the three-phase motor shown in FIG. 12. As shown in the drawing, upon setting a given duty ratio of the BREAK_PWM signals, a single value of the viscosity coefficient is obtained. Accordingly, the viscosity coefficient of the motor can be controlled by adjusting the duty ratio of the BREAK_PWM signals.

Figure 16:
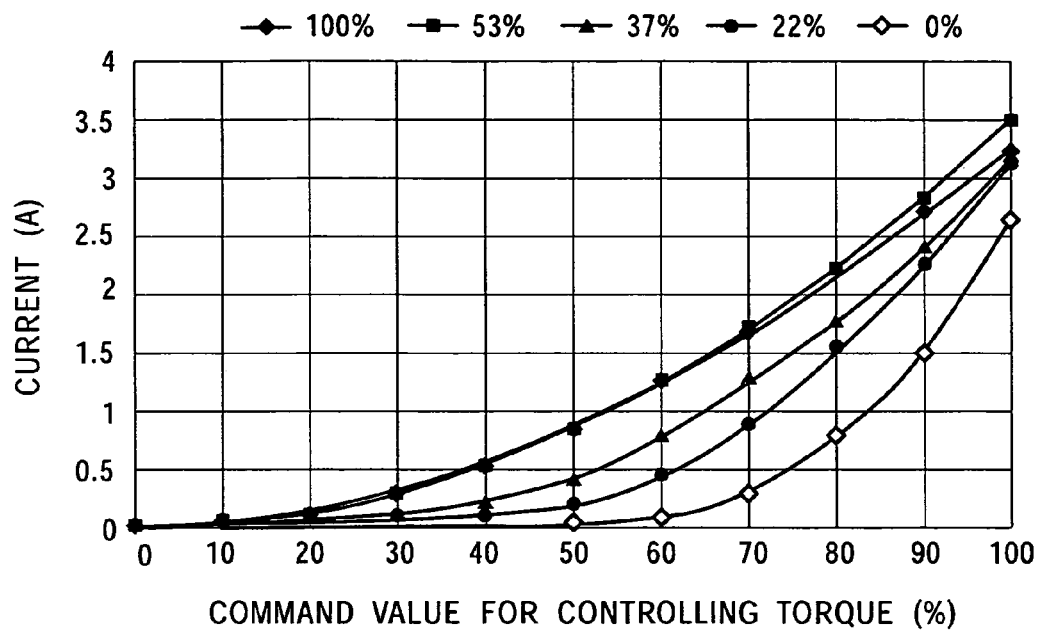
FIG. 16 is a chart which shows the relation between the command value for controlling the torque (the duty ratio of the BREAK_PWM signal) and the effective current in a case of employing the current control method for a three-phase motor shown in FIG. 12.

On the other hand, FIG. 16 shows the relation between the command value for controlling motor torque and the effective value of the motor coil current, in a case of employing the current control method for the three-phase motor shown in FIG. 12, wherein the duty ratio of the high-level BREAK_PWM signals is adjusted. As can be understood from the drawing, the effective value of the motor coil current is controlled by adjusting the duty ratio of the BREAK_PWM signals.

Figure 17:
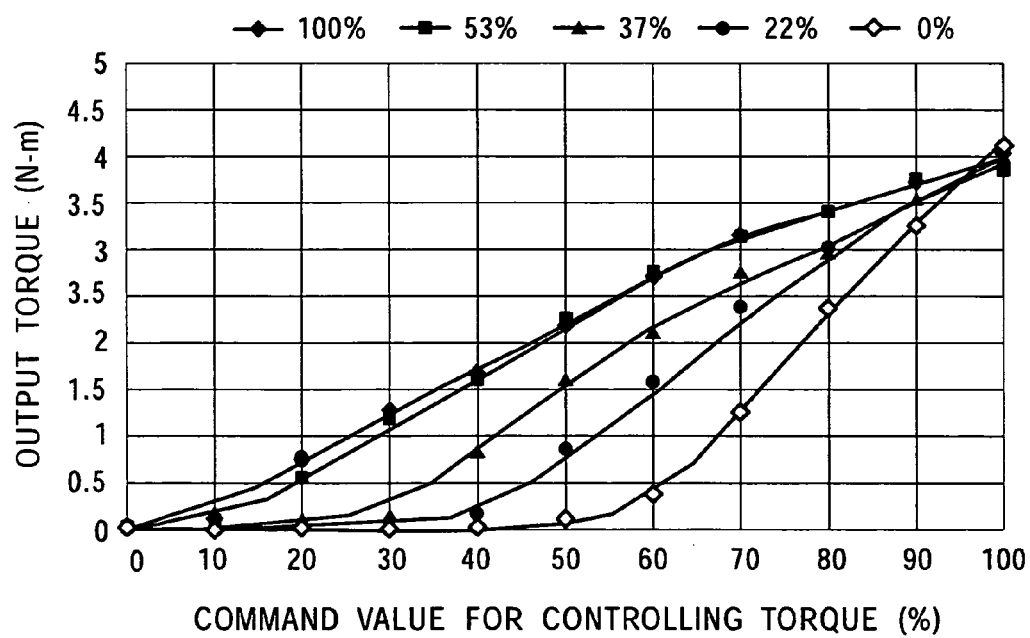
FIG. 17 is a chart which shows the relation between the command value for controlling the torque (the duty ratio of the BREAK_PWM signal) and the output torque of the motor in a case of employing the current control method for a three-phase motor shown in FIG. 12.

On the other hand, FIG. 17 shows the relation between the command value for controlling motor torque and the output torque of the motor, in a case of employing the current control method for the three-phase motor shown in FIG. 12, wherein the duty ratio of the high-level BREAK_PWM signals is adjusted. As can be understood from the drawing, the output motor torque is controlled by adjusting the duty ratio of the BREAK_PWM signals.

As shown in FIG. 15, the viscosity coefficient of the motor can be controlled by adjusting the duty ratio of the high-level BREAK_PWM signals. In the same way, the command value for controlling the motor torque, and the properties of the output motor torque, can be controlled by adjusting the duty ratio of the high-level BREAK_PWM signals.

Now, the properties required for the motor used as a joint actuator of multi-axial robot are as follows.

(1) The motor should have high torque.

(2) The motor should generate torque linearly corresponding to a torque control command value.

(3) The motor should have suitable mechanical flexibility (compliance) for responding to torque occurring due to external influence, with suitable sensitivity.

In the event that the duty ratio of high-level BREAK_PWM signals is great, the motor has the advantages with regard to the properties (1) and (2), but has the disadvantage of difficulty in exhibiting the property (3). Conversely, in the event that the duty ratio of the high-level BREAK_PWM signals is small, the motor has advantages with regard to the property (3), but has the disadvantage of difficulty in exhibiting the properties (1) and (2). The trade-off relation exists between the viscosity coefficient and the output motor torque.

Accordingly, the duty ratio of the BREAK_PWM signals is determined, such that the obtained viscosity coefficient is sufficiently small as compared with the duty ratio thereof of 100%, and loss of the motor current is sufficiently small, based upon the properties of the motor shown in FIGS. 15 and 17. As a result, a duty ratio of the BREAK_PWM signals is determined in the range between 30 and 40%, so that the additional logic circuit converts the original torque control command values into suitable torque control command values so as to satisfy all the above-described required properties.

Figure 18:
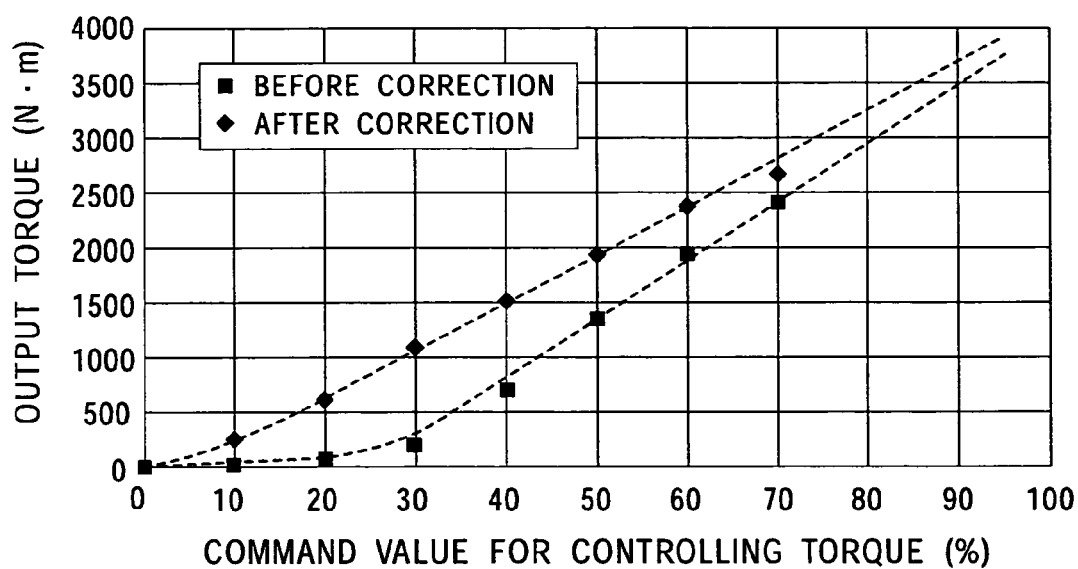
FIG. 18 is a chart which shows the relation between the torque control command value and the generated torque, subjected to mathematical correction, with the duty ratio of the BREAK_PWM signal of 37%.

FIG. 18 shows the relation between the motor torque control value and the output motor torque with the duty ratio of the BREAK_PWM signals of 37%, subjected to mathematical correction. The original relation thereof exhibits marked non-linearity around 30% of the motor torque control command value, and accordingly, correction is performed such that the aforementioned range exhibits general linearity.

Note that in the event that the duty ratio of BREAK_PWM signals is 100%, the gradient (which will be referred to as "$K_{amp}$", hereafter) of the obtained motor torque (which will be referred to as "T", hereafter) as to the motor torque control value (which will be referred to as "r" hereafter) exhibits the maximal value. The aforementioned correction is performed such that the corrected relation between the motor torque control value and the output motor torque with an arbitrary duty ratio of BREAK_PWM signals generally matches the relation therebetween with the duty ratio of BREAK_PWM signals of 100%.

Specific description will be made below regarding the aforementioned correction. First, the gradient of T as to r of 30% or more with the duty ratio of the BREAK_PWM signals of 37% is obtained, which will be referred to as "K".

Next, the torque T0 is obtained, which is generated corresponding to r of 30% with the duty ratio of the BREAK_PWM signals of 37%. Next, the torque T1 is obtained, which is generated corresponding to r of 30% with the duty ratio of the BREAK_PWM signals of 100%. Note that the stall torque Ts of the motor is constant, regardless of the duty ratio of the BREAK_PWM signals.

The corrected relation between the motor torque control value r and the output torque is obtained as follows. In the event that the motor torque control value r is equal to or greater than 0 and equal to or less than 30%, the corrected motor torque control value is a value wherein the motor torque control value r is multiplied by (T1/T0), which is input to the torque control logic circuit. That is to say, the corrected motor torque control value r'=(T1/T0) r.

Figure 19:
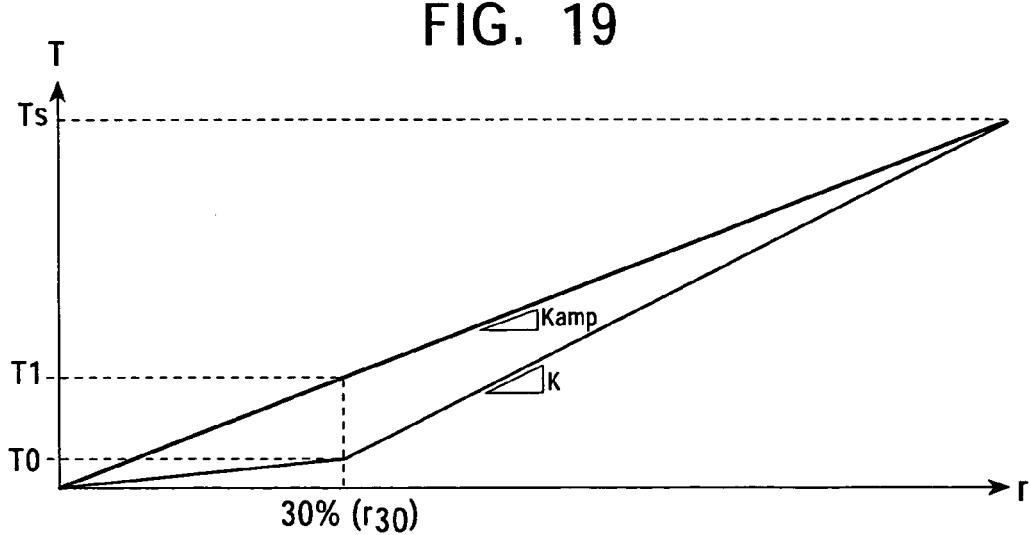
FIG. 19 is a chart for describing the correction method for the relation between the torque control command value and the generated torque shown in FIG. 18.

In the event that the motor torque control value r is equal to or greater than 30%, the corrected motor torque control value $r'=(1/K) \cdot (K_{amp} \cdot r - T0) + r_{30}$, which is input to the torque control logic circuit. Note that $r_{30}$ denotes that r is 30%. As can be easily understood, in the event that the corrected motor torque control value r' is substituted for r in the relation between the motor torque control value and the output motor torque with the duty ratio of BREAK_PWM signals 37% ($T = K \cdot (r - r_{30}) + T0$), the relation $T = K_{amp} \cdot r'$ is obtained, which matches the relation therebetween with the duty ratio of BREAK_PWM signals 100% (see FIG. 19).

B. Operation Speed and Mechanical Compliance of Joint Actuator for Robot

A ambulatory mobile robot has been disclosed in Japanese Unexamined Patent Application Publication No. 2001-233691, which has been transferred to the present applicant, wherein high-speed switching is repeated between the open-link state and the closed-link state according to the external situation or the working situation. The robot has legs including one or more rotational joints (a joint may have two or more degrees of freedom), and has a configuration wherein the legs include compliance means (e.g., a speed reducer with backlash), which exhibits the minimal compliance so as to eliminate the margin of error for the movement thereof, and furthermore, the movable range of each leg is suitably controlled. Note that, even in the event that an actuator for driving a joint portion has no means for obtaining the torque information, high-speed switching between the closed-link state and the open-link state is repeated in a sure manner.

For example, a bipedal robots includes geared motors with small backlash at portions close to the waist serving as the origin of the coordinates system, and geared motors with great backlash at portions close to a toe or a finger, so as to obtain the optimal properties.

Furthermore, the second method for optimizing the properties of a robot is that the margin of positional error is controlled by adjusting the open-loop gain of the positional servo compensator of each joint-axis actuator. That is to say, in the event that the actuators have uniform backlash, servo deviation serving as backlash is controlled by adjusting the servo gain.

The present embodiment provides an arrangement wherein the joint actuator of such a bipedal robot is further optimized. That is to say, the present embodiment provides an arrangement wherein the phase compensating element of a servo controller is adjusted for each joint, as well as the proportional gain thereof.

Figure 20:
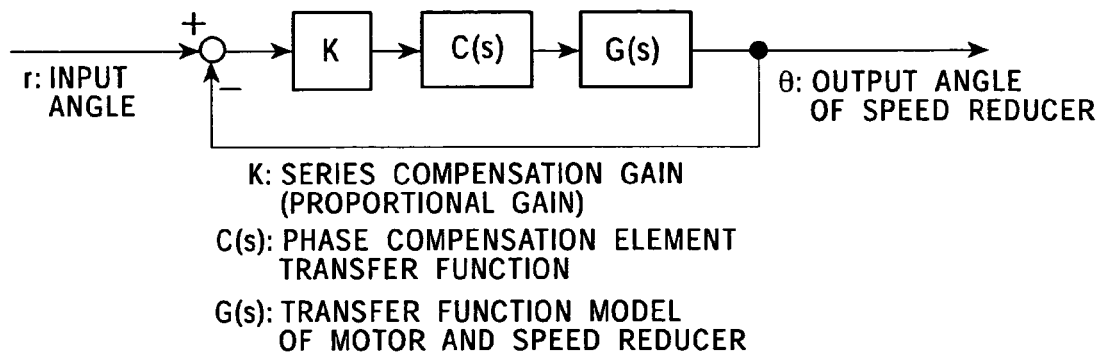
FIG. 20 is a diagram which shows a configuration of a servo controller for an actuator according to an example of the present invention.

FIG. 20 shows a configuration of a servo controller of an actuator according to an embodiment of the present invention. As shown in the drawing, the servo controller has two control elements of the proportional gain K of the series compensation, and the phase compensation element C(s), wherein the phase compensation element is adjusted for each joint, as well as the proportional gain.

Note that the phase compensation element is represented by the following expression. Here, n and m denote predetermined natural numbers, and $a_i$ and $b_i$ denote predetermined real numbers. Note that the phase compensation element serving as a state variable corresponds to a feedback gain.

$$C(s) = \frac{\sum_{i=0}^{m} b_i \cdot s^i}{\sum_{i=0}^{n} a_i \cdot s^i}$$ [Expression 6]

On the other hand, the transfer function model of a motor and a speed reducer G(s) is represented by the following expression. Here, s denotes a Laplacian operator, K denotes a motor gain, J denotes a moment of inertia of the motor, and D denotes a viscosity coefficient of the motor. Note that, in this case, taking an assumption that the backlash amount of the speed reducer is sufficiently small, G(s) is approximated using a liner model.

$$G(s) = \frac{K}{Js^2 + Ds}$$ [Expression 7]

Figure 21:
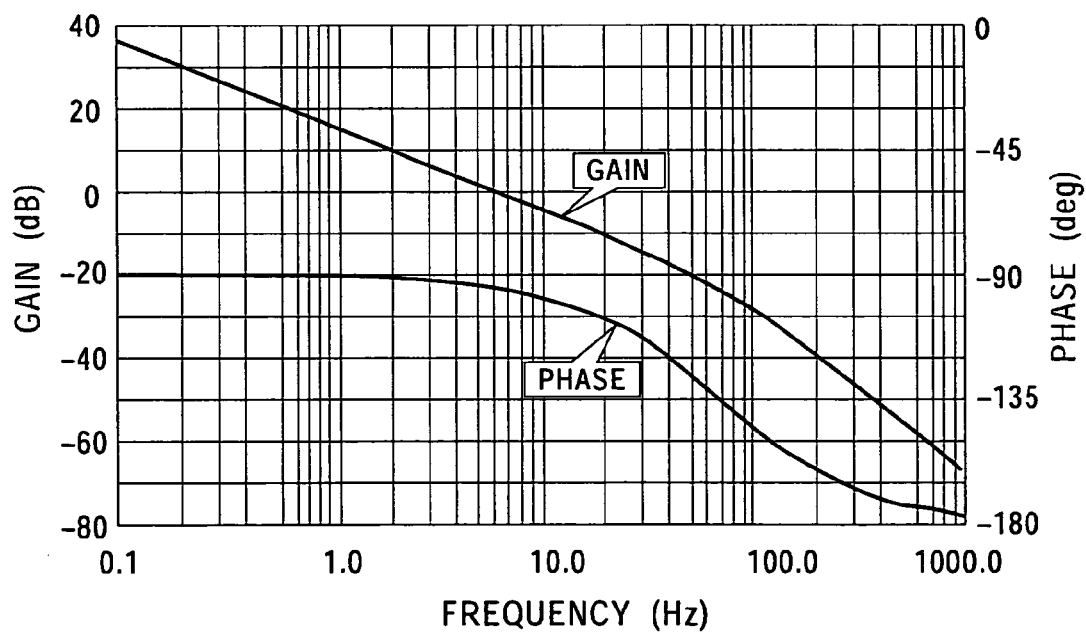
FIG. 21 is a chart which shows the frequency properties of the gain and the phase, obtained from a transfer function model for the motor and speed reducer shown in FIG. 20.

FIG. 21 shows the gain and phase frequency properties of the transfer function model G(s) of the motor and the speed reducer shown in FIG. 20.

First, description will be made regarding design examples of phase compensation control in the servo controller shown in FIG. 20, wherein a desired phase compensation band is determined (i.e., a desired frequency band is determined while maintaining the phase compensation amount so as to be constant), with reference to FIG. 22.

Three design examples are shown in the drawing.

(1) C(s)-1: Example of phase compensation control exhibiting a gain amplification of approximately +5.6 dB with a band of 1.0 to 100 Hz, and a phase lead of approximately +18 deg.

(2) C(s)-2: Example of phase compensation control exhibiting a gain amplification of approximately +5.6 dB with a band of 0.1 to 10 Hz, and a phase lead of approximately +18 deg.

(3) C(s)-3: Example of phase compensation control exhibiting a gain amplification of approximately +5.6 dB with a band of 10 to 1 kHz, and a phase lead of approximately +18 deg.

As described above, frequency properties of the actuator can be freely controlled by adjusting the frequency band for performing phase compensation. Thus, the frequency properties of a joint shaft of a robot formed of such actuators can be dynamically adjusted according to the attitude of the robot or movement situation.

Figure 22:
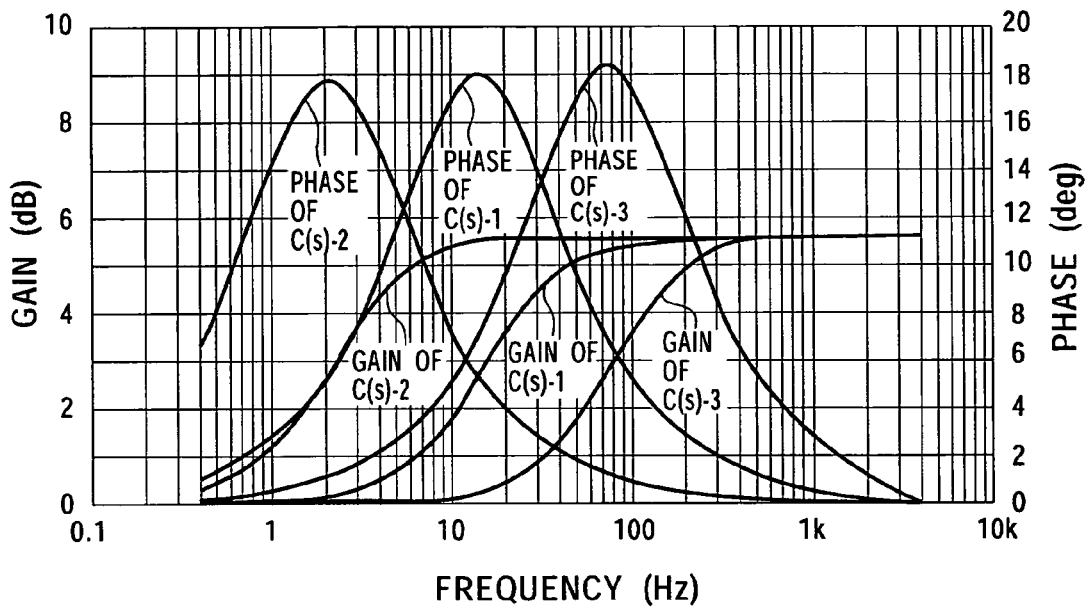
FIG. 22 is a chart for describing design examples of a phase-compensation-control servo controller for freely adjusting the frequency band for phase compensation.

Note that while description has been made regarding examples of phase lead compensation with reference to FIG. 22, an arrangement may be made wherein a desired frequency band and a desired phase lag are determined such that frequency properties are dynamically adjusted using phase lag compensation in the same way.

Next, description will be made regarding design examples of phase compensation control in the servo controller shown in FIG. 20, wherein a desired phase compensation amount is determined (i.e., a desired phase compensation amount is determined while maintaining the frequency band so as to be constant), with reference to FIG. 23.

Three design examples are shown in the drawing.

(4) C(s)-4: Example of phase compensation control exhibiting a gain amplification of approximately +3.5 dB with a band of 4.0 to 70 Hz, and a phase lead of approximately +12 deg.

(5) C(s)-5: Example of phase compensation control exhibiting a gain amplification of approximately +5.6 dB with a band of 2.0 to 70 Hz, and a phase lead of approximately +18 deg.

(6) C(s)-6: Example of phase compensation control exhibiting a gain amplification of approximately +6.5 dB with a band of 1.0 to 70 Hz, and a phase lead of approximately +21 deg.

As described above, frequency properties of the actuator can be freely controlled by adjusting the phase compensation amount for performing phase compensation. Thus, the frequency properties of a joint shaft of a robot formed of such actuators can be dynamically adjusted according to the attitude of the robot or movement situation.

Figure 23:
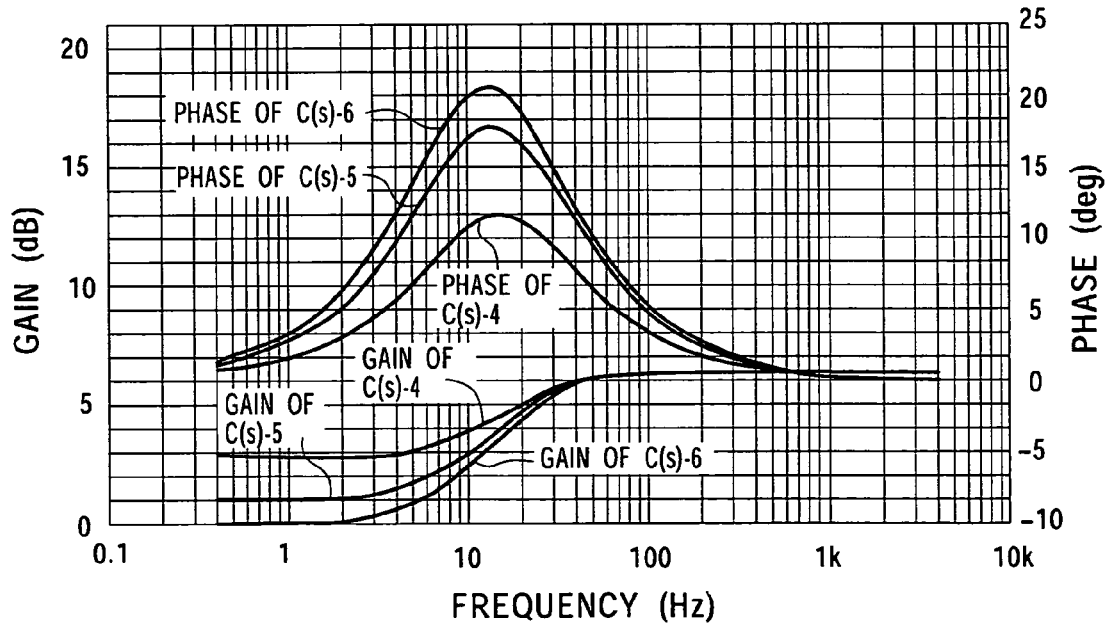
FIG. 23 is a chart for describing design examples of a phase-compensation-control servo controller for freely adjusting the amount of phase compensation.

Note that description has been made regarding examples of phase lead compensation with reference to FIG. 23, an arrangement may be made wherein a desired phase compensation amount and a desired phase lag are determined such that frequency properties are dynamically adjusted using phase lag compensation in the same way.

Next, description will be made regarding design examples of the servo controller shown in FIG. 20, wherein the series compensation gain K is adjusted, with reference to FIG. 24. The drawing shows the frequency properties wherein K is changed by ±3 dB with regard to the frequency properties shown in FIG. 22. As shown in the drawing, the series compensation gain can be freely adjusted.

Figure 24:
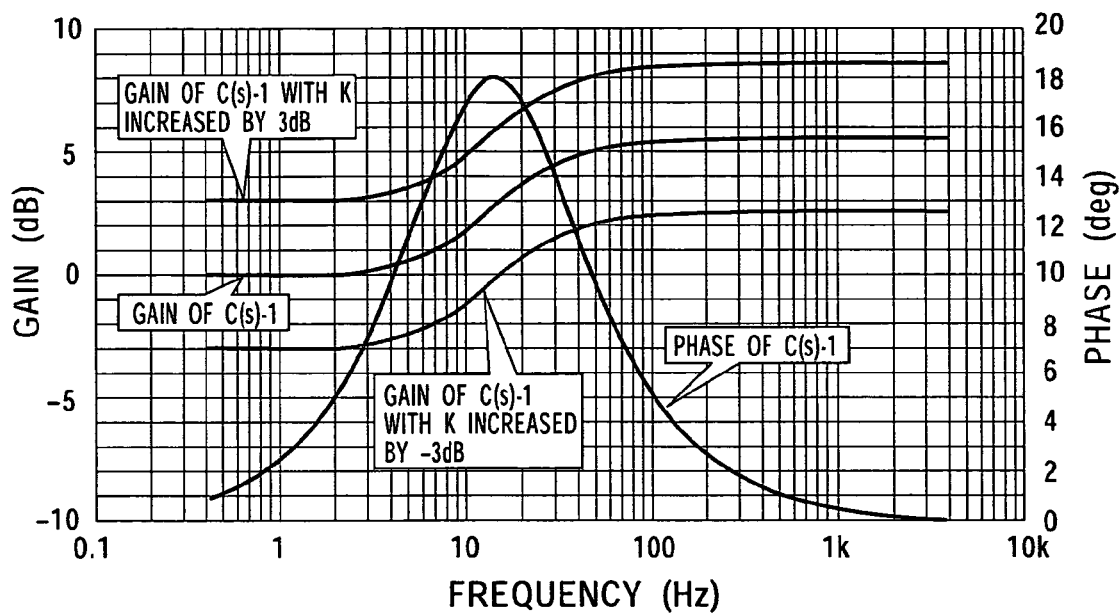
FIG. 24 is a chart for describing design examples of the servo controller shown in FIG. 20, wherein the magnitude of the series compensation gain K can be adjusted.

In order to apply the phase compensation control shown in FIGS. 22 through 24 to the joint shaft driving actuators of a robot, the actuator is needed to include a communication protocol for dynamically or statically adjusting the parameters for controlling the controllers thereof. Thus, the properties of joint shafts of the robot can be adjusted in a wide range.

Next, description will be made regarding the properties of an actuator including a servo controller having such properties.

Figure 25:
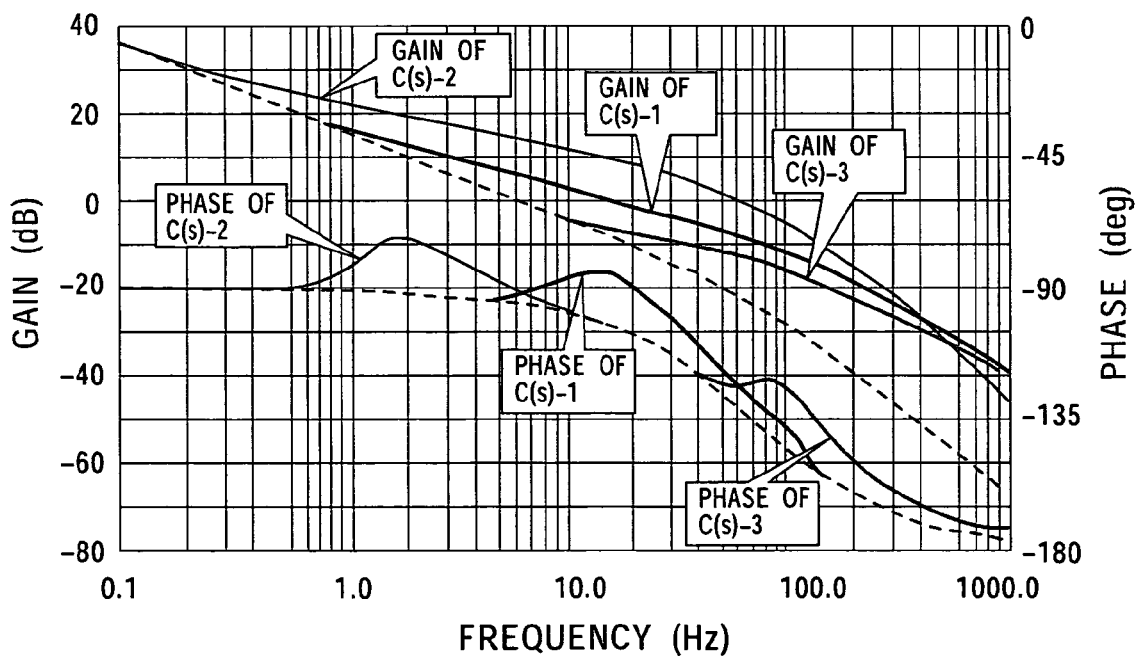
FIG. 25 is a chart which shows open-loop properties of the servo controller for the actuator shown in FIG. 20, wherein the frequency band for performing phase compensation is adjusted while maintaining the amount of phase compensation, as shown in FIG. 22.

FIG. 25 shows open-loop properties of the actuator including the servo controller such that a desired frequency band is determined while maintaining the phase compensation amount constant as shown in FIG. 22.

(7) Open loop gain properties employing C(s)-2: The frequency property exhibits a gain amplification of approximately +5.6 dB with a band of 0.1 to 10 Hz, and a phase lead of approximately +18 deg. In this case, the frequency property exhibits relatively high gain over the entire frequency range, and accordingly, exhibits improved positioning precision and improved response, but leading to loss of energy. Furthermore, in the event that the motor load increases, the actuator cannot exhibit stable movement.

(8) Open loop gain properties employing C(s)-1: The frequency property exhibits a gain amplification of approximately +5.6 dB with a band of 1.0 to 100 Hz, and a phase lead of approximately +18 deg. In this case, the frequency property exhibits an intermediate property between the frequency properties employing C(s)-2 and C(s)-3.

(9) Open loop gain properties employing C(s)-3: The frequency property exhibits a gain amplification of approximately +5.6 dB with a band of 10 to 1 kHz, and a phase lead of approximately +18 deg. In this case, phase compensation is performed only in a high-frequency range, and accordingly, this phase compensation control has marked advantages regarding high-speed actions such as running, jumping, dancing, or the like, while having little advantages regarding slow actions.

As described above, frequency properties of the actuator can be freely controlled by adjusting the frequency band for performing phase compensation. Thus, the frequency properties of a joint shaft of a robot formed of such actuators can be dynamically adjusted according to the attitude of the robot or movement situation.

Figure 26:
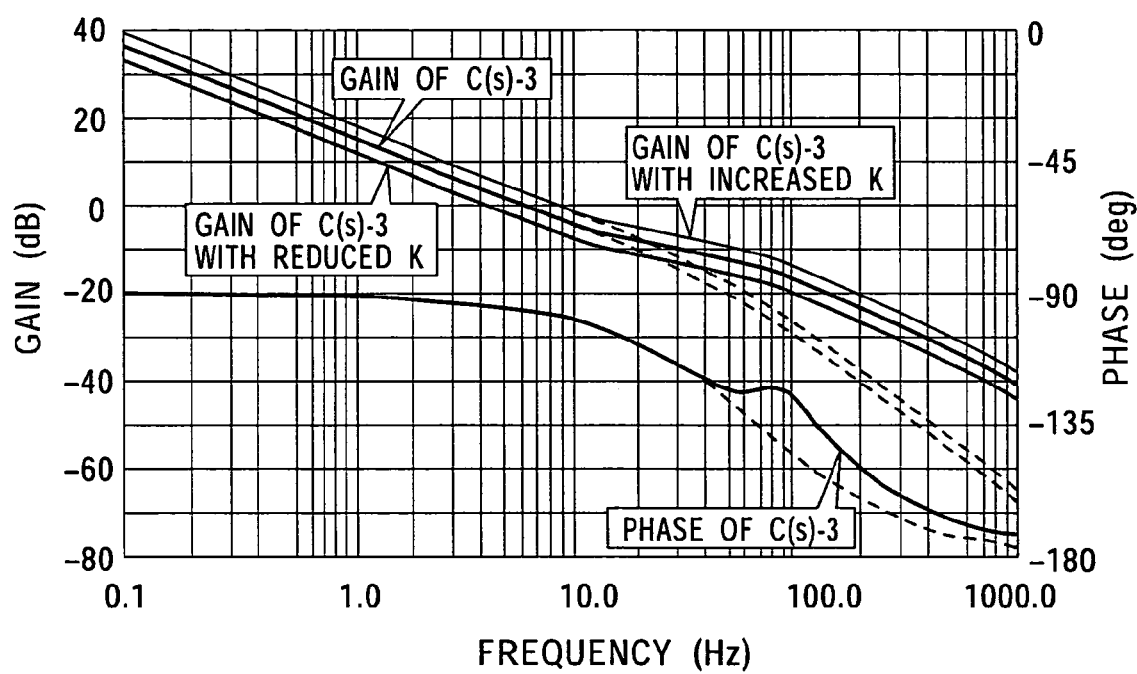
FIG. 26 is a diagram which shows the open-loop properties of the example C(s)-3 shown in FIG. 25, further subjected to control by the series compensation gain.
Figure 28:
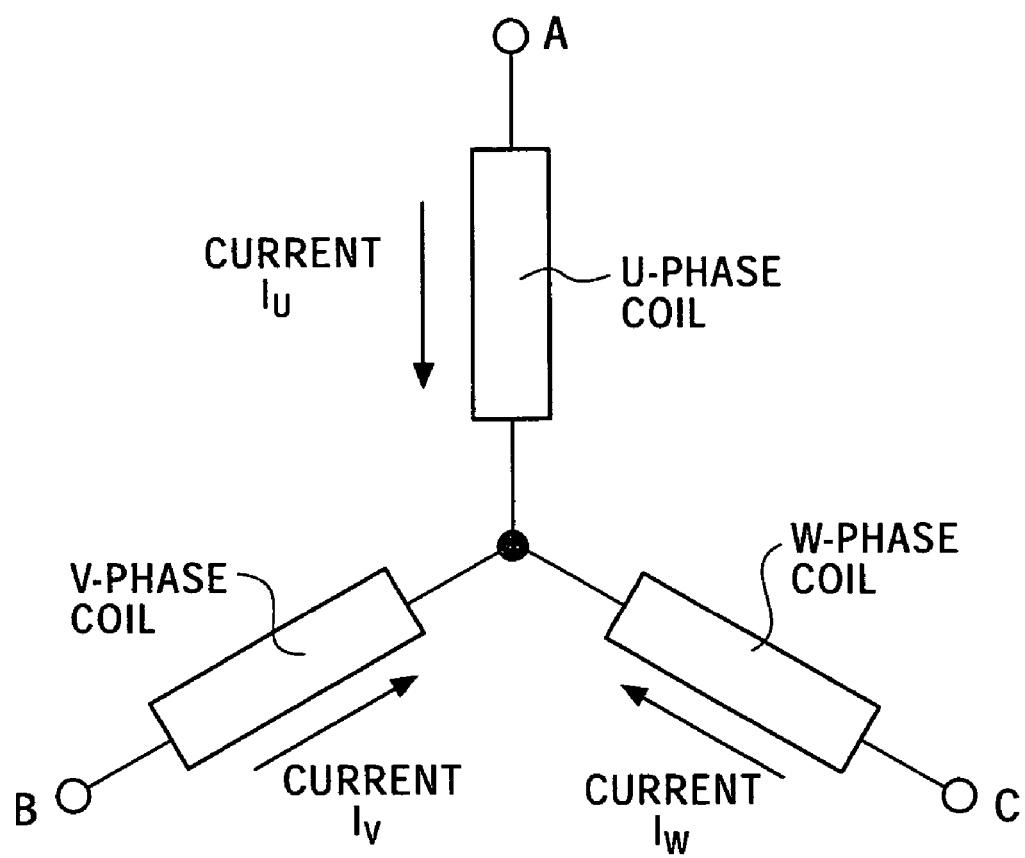
FIG. 28 is a diagram which shows a star connection (conventional example) for a three-phase servo motor.
Figure 29:
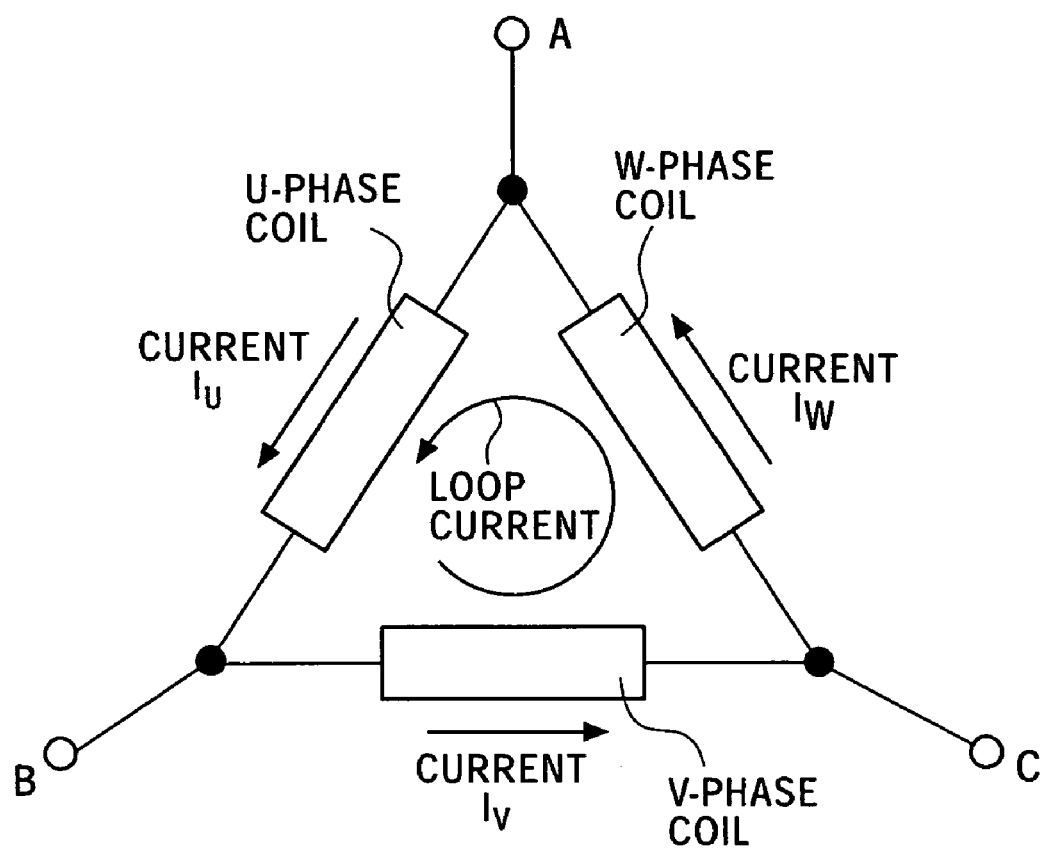
FIG. 29 is a diagram which shows a delta connection (conventional example) for a three-phase servo motor.
Figure 30:
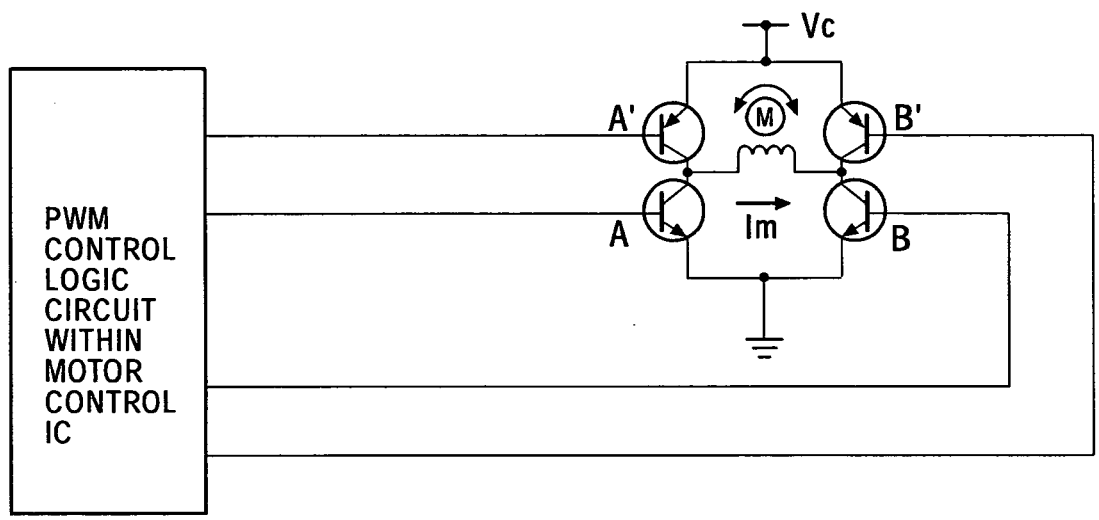
FIG. 30 is a diagram which shows a configuration example (conventional example) of an equivalent circuit of a current control circuit for supplying coil current, employed in a DC motor.
Figure 31:
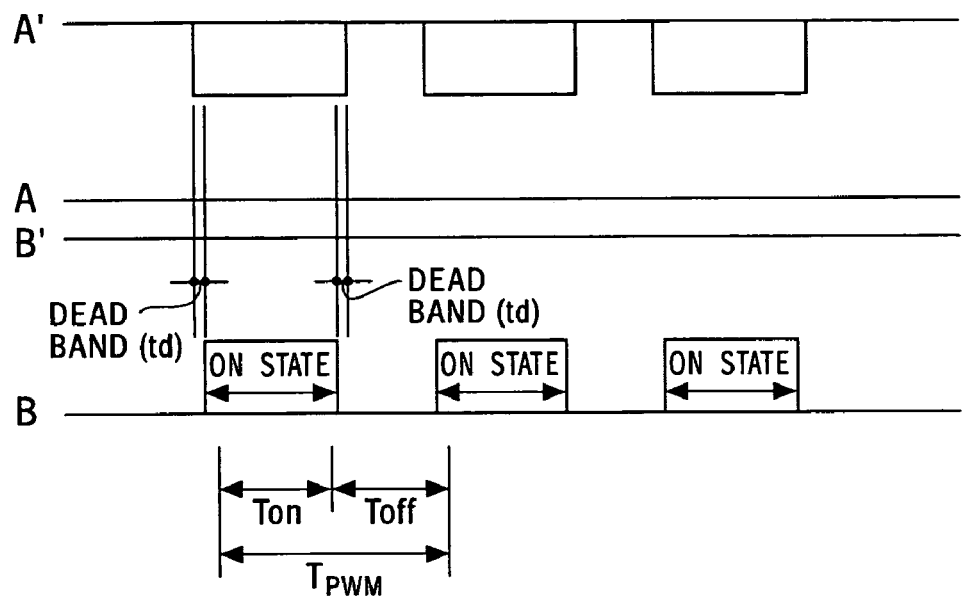
FIG. 31 is a diagram which shows waveforms of the control logic signals for controlling the transistors for performing on/off switching operations of the coil, output from the PWM control logic circuit shown in FIG. 30.
Figure 32:
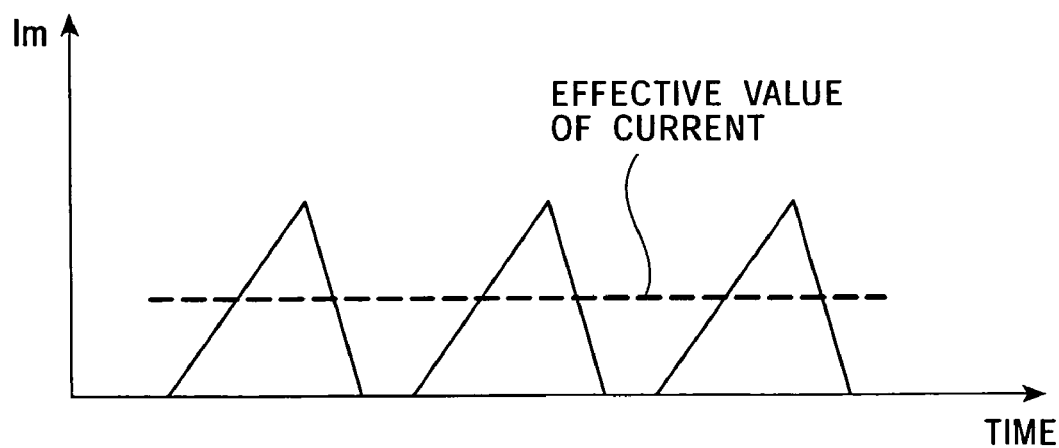
FIG. 32 is a chart which shows a waveform of the coil current controlled by the current control circuit shown in FIG. 30.
Figure 33:
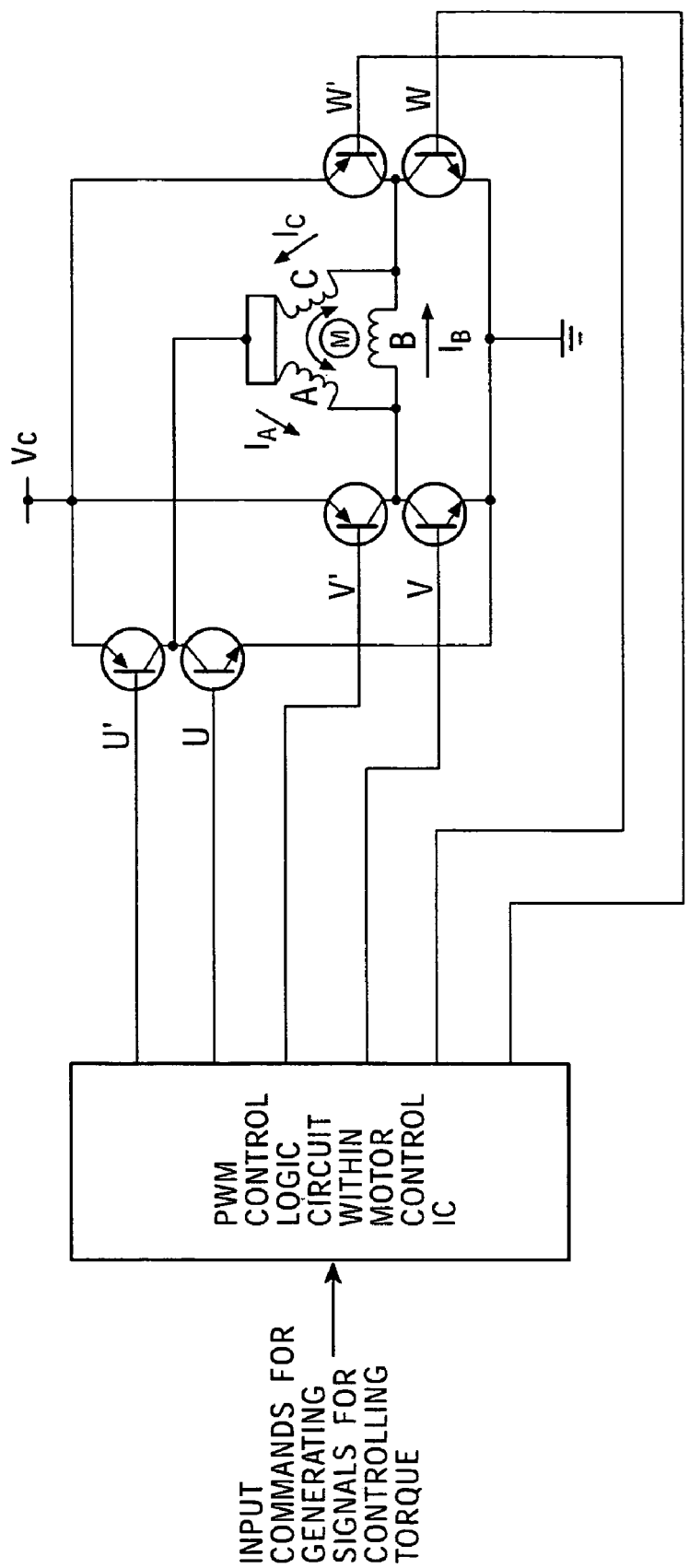
FIG. 33 is a diagram which shows a configuration example (conventional example) of an equivalent circuit of a current control circuit for supplying coil current, employed in a three-phase motor.
Figure 34:
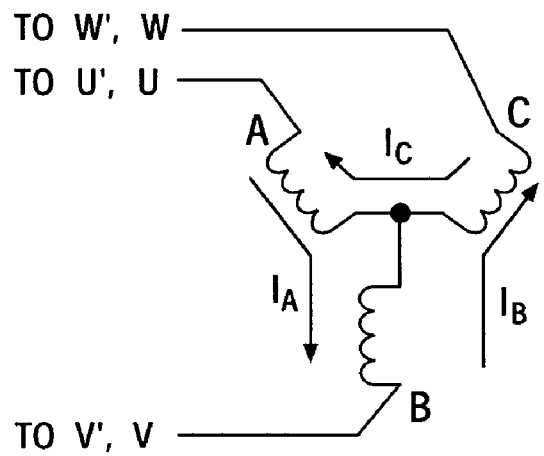
FIG. 34 is a diagram which shows a configuration of a bridge portion in a case of employing a three-phase coil formed with a star connection, rather than a delta connection.
Figure 35:
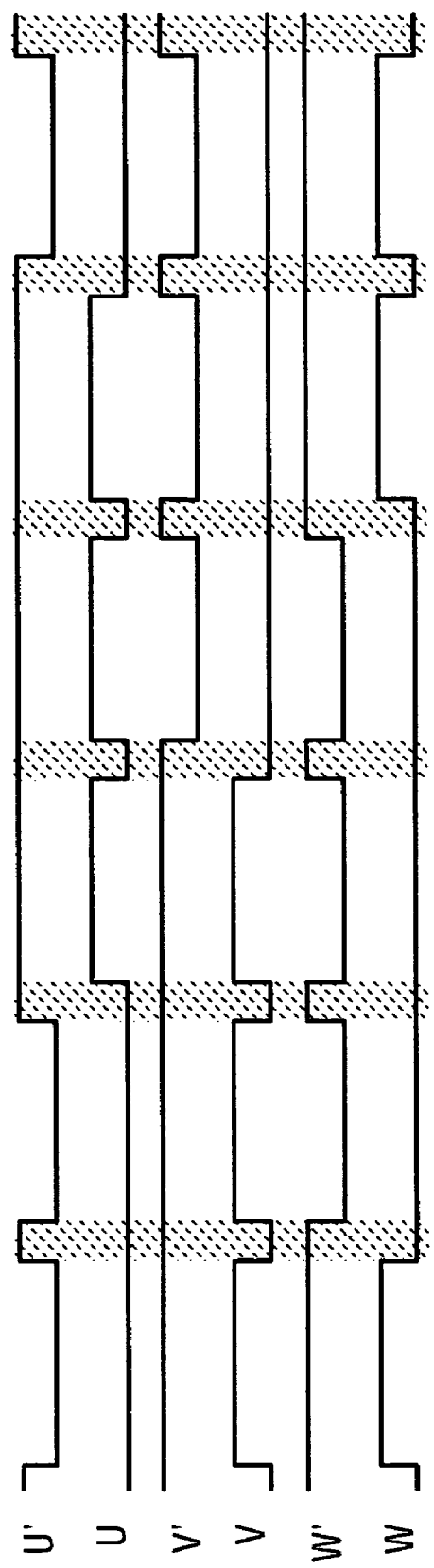
FIG. 35 is a diagram which shows waveforms of the control logic signals for controlling the transistors for performing on/off switching operations of the coils, output from the PWM control logic circuit shown in FIG. 33.
Figure 36:
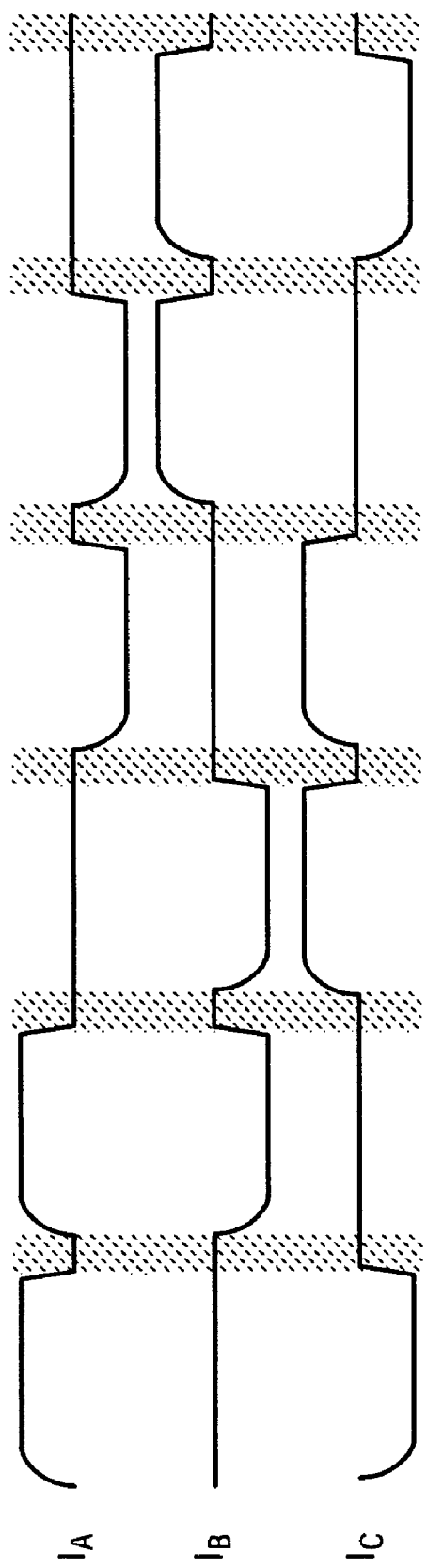
FIG. 36 is a chart which shows waveforms of the coil currents controlled by the current control circuit shown in FIG. 33.

Furthermore., FIG. 26 shows the open loop gain properties subjected to phase lead compensation only in the high-frequency range shown in Example (9) in FIG. 25, further subjected to series compensation gain control. In this case, a curve of the frequency property with a constant phase shifts in the direction of the gain in the same way as with the examples shown in FIG. 24.

With the example shown in FIG. 25, the phase compensation example (9) has little advantages to low-speed actions. However, the phase compensation control, wherein gain is further increased in a low-frequency range for the phase compensation example (9), exhibits small control deviation, as shown in FIG. 26. As a result, the actuator can make high-speed response to command values, even in a case of low-speed action.

Description has been made regarding a mechanism for adjusting the phase compensating element of a servo controller of an actuator for each joint portion, as well as the proportional gain of the servo controller. This mechanism enables adjustment of force for each local portion, and adjustment of compliance (mechanical compliance) of each joint portion, in order to exhibit stable and high-efficient movement.

For example, from the point of a positional control system, the movement of each joint shaft should be controlled by a servo controller having a high gain and wide band so as to reduce control deviation. On the other hand, from the point of a dynamic model, the movement thereof should not be controlled only with a high gain and wide band, but also should be controlled by reducing the gain or adjusting the frequency band for phase compensation, giving consideration to the influence of the potential energy and the kinetic energy.

Furthermore, an arrangement may be made wherein the amount of viscosity resistance of the actuator is controlled, in addition to the above-described control of the movement speed and the mechanical compliance thereof during an action.

In general, a motor for generating rotational torque due to a predetermined magnetic distribution formed by controlling a supplied current to coils, has a configuration wherein a switching operating circuit formed of a first transistor switch set for connecting the coil terminals to the power supply voltage, and a second transistor switch set for connecting the coil terminals to the ground, is driven by PWM control so as to control coil currents, thereby obtaining desired torque, a rotational position, a rotational speed, and the like.

In this case, at the time of no current being applied to the coils of the motor due to the coils being open-circuited, the current (more precisely, the flow of charges), which flows in the coil of the motor, decays, leading to loss of torque. Furthermore, the motor having such a configuration often causes irregularity in torque due to cogging (as described above). In order to solve the aforementioned problem, the motor coils are controlled to be short-circuited during off-periods of the motor coils, instead of the open-circuited state, thereby preventing immediate decay of the current (more precisely, the flow of charges), which flows in the coil of the motor. At this time, the counterelectromotive force occurs in the motor coil due to the magnetic flux density from the permanent magnet. Accordingly, the force occurs in the direction reverse to the rotational direction of the motor due to the counterelectromotive force, thereby exhibiting viscosity resistance against the rotation from the external force, and thereby obtaining effects similar to braking. Such a viscosity resistance of the motor reduces irregularity in torque due to cogging, without loss of torque.

On the other hand, a motor having such a configuration wherein motor coils are controlled to be short-circuited during off-periods of the motor has a kind of viscosity resistance, as described above. However, in the event of employing such motors in a robot, a problem occurs that compliance (mechanical compliance) is insufficient due to braking effects from coil being short-circuited. Accordingly, with the present invention, the ratio of the period of the state wherein the motor coils are open-circuited as to the period of the state wherein the motor coils are short-circuited during an off-period of the motor coils, is adjusted according to desired mechanical properties, thereby eliminating the problems of loss of torque, and the problem of irregularity in torque from cogging, due to decay of current (more precisely, the flow of charges), which flows in the coil of the motor, during periods wherein the motor coils are open-circuited, and the problem of shortage of compliance (mechanical compliance) from the braking effects due to the coil being short-circuited during off-periods of the motor coils, at the same time.

While the ratio of the state of on-periods of the motor coils as to the state of off-periods thereof can be controlled with PWM control, the ratio of the state wherein the motor coils are open-circuited, as to the state wherein the motor coils are short-circuited, can be controlled during the off-periods of the motor coils with PWM control, as well. Also, the viscosity resistance and the mechanical compliance can be controlled by performing PWM control for the motor coil current in the same way as described above with reference to FIGS. 4 through 7.

C. Application to a Bipedal Mobile Robot

Next, description will be made regarding a bipedal mobile robot including an actuator having a servo controller according to the present invention at each joint portion. FIG. 27 is a schematic diagram which shows a configuration example of a bipedal mobile robot having a predetermined number of degrees of freedom.

The drawing shows a humanoid robot including two arms and two legs. The present robot has a trunk including two arms, two legs, and a head portion, wherein the head portion has four degrees of freedom formed of a neck roll axis, a first and a second neck pitch axes, a neck yaw axis, and each of the left and right arms have at least four degrees of freedom formed of a shoulder joint pitch axis, a shoulder joint roll axis, a shoulder joint yaw axis, and an elbow joint pitch axis, the trunk has two degrees of freedom formed of a trunk roll axis and a trunk pitch axis, and each of the left and right legs have at least six degrees of freedom formed of a crotch-joint yaw axis, a crotch-joint roll axis, a crotch-joint pitch axis, a knee-joint pitch axis, an ankle-joint pitch axis, and an ankle-joint roll axis.

The aforementioned degrees of freedom of each joint are provided by the actuators including the above-described servo controller. Detailed description will be made below regarding examples for controlling the gain and the phase compensation properties of the actuator employed in each joint portion.

(1) Properties of the Actuator Employed in the Neck Portion

With the actuator employed in the neck portion, a high proportional gain is employed in order to improve the positioning precision with the highest priority. Furthermore, a suitable amount of phase lead is employed within a range in which deterioration in the stability does not occur due to an increase of the proportional gain while maintaining the speed of the movement. Furthermore, a great viscosity coefficient is employed for the joint in order to obtain robustness against the vibration due to the external influence occurring at the time of the portions lower than the trunk moving.

(2) Properties of the Actuator Employed in the Shoulder and Elbow Portions

In the event that the robot performs a sequential movement such as walking, dancing, or the like, the actuator is controlled to have the properties so as to exhibit the improved mechanical compliance as compared with the positioning precision. In this case, the viscosity coefficient of the joint is set to a small value so as to exhibit movement with compliance. Furthermore, the proportional gain is set to a low value in order to reduce power consumption. Furthermore, the frequency band for performing phase lead compensation is set to a great value, and the phase lead is set to a great value, in order to increase the speed of the movement. While the robot performs various types of movements, the robot may perform a reciprocal movement as like a pendulum swinging. In this case, the viscosity coefficient of the corresponding joints and the proportional gain are set to the minimal values so as to obtain mechanical compliance, thereby facilitating use of a great part of dynamic energy for the movement.

On the other hand, in the event that the robot performs a loading movement such as pushing or pulling an object, the actuator is controlled such that the properties for improving positioning precision with the highest priority, and the properties for improving the mechanical compliance, are dynamically switched according to loading torque. In the event that the robot performs movement with force greater than the loading torque, the proportional gain and the viscosity coefficient of the corresponding joints are increased. On the other hand, in the event that the robot performs movement with a constant loading force following the loading torque, control is not performed only according to top-down positioning command values, but is also performed by adjusting the proportional gain and the viscosity coefficient of the corresponding joints based upon the loading torque detected by a torque detector within the actuator. Specifically, the proportional gain and the viscosity coefficient of the corresponding joints are reduced as compared with a case of the above-described loading movement so as to obtain mechanical compliance.

(3) Properties of the Actuator Employed in the Trunk Portion

The viscosity coefficient of the corresponding joints is increased in order to obtain robustness against the vibration occurring from the external influence due to the movement thereof. The proportional gain is set to a high value in order to improve the positioning precision with the highest priority. A suitable amount of phase lead is employed within a range in which deterioration in the stability does not occur due to an increase of the proportional gain while maintaining the speed of the movement.

(4) Properties of the Actuator Employed in the Crotch-joint Portion

The viscosity coefficient of the corresponding joints is increased in order to obtain robustness against the vibration occurring from external influence due to the movement thereof. The proportional gain is set to a high value in order to improve the positioning precision with the highest priority. A small amount of phase lead is employed within a range in which deterioration in the stability does not occur due to an increase of the proportional gain while maintaining the speed of the movement.

(5) Properties of the Actuator Employed in the Knee Portion

At the time of the leg of the robot being off the ground, or at the point of the leg touching the ground, the actuator is controlled so as to improve the mechanical compliance with a priority higher than with the positioning precision. That is to say, the viscosity coefficient of the corresponding joints is reduced in order to exhibit the movement with compliance. Furthermore, the proportional gain is set to a small value in order to reduce the power consumption, as well as exhibiting the movement with compliance. Furthermore, the frequency band for performing phase lead compensation is increased, and the phase lead is set to a great value, in order to increase the speed of the movement.

On the other hand, at the time of the leg supporting the body of the robot, the actuator is controlled so as to improve the positioning precision with a priority higher than with the mechanical compliance. The viscosity coefficient of the corresponding joints is increased in order to obtain robustness against the vibration occurring from the external influence due to the movement thereof. The proportional gain is set to a high value in order to improve the positioning precision with the highest priority. A small amount of phase lead is employed within a range in which deterioration in the stability does not occur due to an increase of the proportional gain while maintaining the speed of the movement.

(6) Properties of the Actuator Employed in the Ankle Portion

At the time of the leg of the robot being off the ground, or at the point of the leg touching the ground, the actuator is controlled so as to improve the mechanical compliance with a priority higher than with the positioning precision. The viscosity coefficient of the corresponding joints is set to a small value so as to obtain the mechanical compliance, thereby reducing the impact due to the leg portion touching the ground. Furthermore, the frequency band for performing phase compensation is increased, and the phase lead is set to a great value, in order to increase the speed of the movement.

On the other hand, at the time of the leg supporting the body of the robot, the torque generated at the ankle portion is increased, and the viscosity coefficient of the corresponding joints is set to a great value in order to obtain robustness against the vibration occurring from the external influence due to the movement thereof. The proportional gain is set to a high value in order to improve the positioning precision for the ankle portion. A small amount of phase lead is employed within a range in which deterioration in the stability does not occur due to an increase of the proportional gain while maintaining the speed of the movement.

As above, detailed description has been made regarding the present invention with reference the specific embodiments. However, it is needless to say that various modifications and equivalent arrangements may be easily made by one skilled in the art without departing from the spirit and scope of the invention.

The scope of the present invention is not restricted to a particular device which is referred to as a "robot". That is to say, the present invention may be applied to a device in other industrial fields as well, such as a toy or the like, as long as the product is a machine apparatus or mobile apparatus, which performs movement similar to the human movement, using electric or magnetic operation.

On the other hand, while description has been made in this specification regarding circuit examples including switching devices formed of bipolar transistors for performing switching control of coil currents applied to the motor coils, it is needless to say to one skilled in the art that this kind of control circuit may readily form these of MOS-FETs or other semiconductor devices.

While the present invention has been described with reference to what are presently considered to be the preferred embodiments, it is to be understood that the invention is not limited to the disclosed embodiments. The scope of the present invention should be determined by the appended claims.

What is claimed is:

1. A motor having a controller for generating rotational torque due to a predetermined magnetic flux distribution formed by controlling supplied current to coils, said controller comprising:
   coil on/off switching means for performing switching operations between an on-state in which current is supplied to said coils, and a first off-state in which the coil terminals are open-circuited when a low-level control signal is received, and between said on-state in which said current is supplied to said coils, and a second off-state in which the coil terminals are short-circuited when a high-level control signal is received; and
   coil current control means for controlling a switching operation of said coil on/off switching means according to commands input to said motor,
   wherein said coil current control means controls said motor to have a viscosity resistance by adjusting a ratio of said first off-state as to said second off-state, during a period wherein no current is supplied to said coils.

2. A motor according to claim 1, wherein said coil on/off switching means comprises a first transistor switch set for connecting said coil terminals to the power supply voltage, and a second transistor switch set for connecting said coil terminals to the ground.

3. A motor according to claim 2, wherein said coil current control means controls switching between the on-period and off-period of said first and second transistor switch sets with PWM (Pulse Width Modulation) method.

4. A motor according to claim 1, wherein said coil current control means controls the ratio of said first off-state as to said second off-state, during a period wherein no current is supplied to said coils, with PWM (Pulse Width Modulation) method.

5. A motor according to claim 1, wherein said coil current control means increases the ratio of said first off-state as to the off-state of said coil in order to increase the mechanical compliance of said motor.

6. A motor according to claim 1, wherein said coil current control means increases the ratio of said second off-state as to the off-state of said coil in order to increase the viscosity resistance of said motor.

7. A method for generating rotational torque with a motor due to a predetermined magnetic flux distribution formed by controlling a supplied current to coils, said method comprising:
 performing a first switching operation of a coil on/off switching unit between an on-state in which current is supplied to said coils, and a first off-state in which the coil terminals are open-circuited when a low-level control signal is received;
 performing a second switching operation of said coil on/off switching unit between said on-state in which said current is supplied to said coils, and a second off-state in which the coil terminals are short-circuited when a high-level control signal is received;
 controlling a switching operation of a coil current control unit of said coil on/off switching unit according to commands input to said motor; and
 controlling said motor with said coil current control unit to have a viscosity resistance by adjusting a ratio of said first off-state as to said second off-state, during a period in which no current is supplied to said coil.

8. The method according to claim 7, further comprising:
 connecting said coil terminals to a power supply voltage by a first transistor switch set of said coil on/off switching unit; and
 connecting said coil terminals to ground by a second transistor switch set.

9. The method according to claim 8, further comprising:
 controlling with said coil current control unit a switching between the on-period and off-period of said first and second transistor switch sets with a PWM (Pulse Width Modulation) method.

10. The method according to claim 7, further comprising:
 controlling with said coil current control unit the ratio of said first off-state as to said second off-state, during a period in which no current is supplied to said coils, with a PWM (Pulse Width Modulation) method.

11. The method according to claim 7, further comprising:
 increasing with said coil current control unit a ratio of said first off-state as to the off-state of said coil in order to increase a mechanical compliance of said motor.

12. The method according to claim 7, further comprising:
 increasing with said coil current control unit a ratio of said second off-state as to the off-state of said coil in order to increase the viscosity resistance of said motor.

* * * * *